(12) United States Patent
Hadley

(10) Patent No.: US 10,526,034 B2
(45) Date of Patent: Jan. 7, 2020

(54) ANTI-RATTLE FOLDING SCOOTER

(71) Applicant: RAZOR USA LLC, Cerritos, CA (US)

(72) Inventor: Robert Hadley, Yorba Linda, CA (US)

(73) Assignee: RAZOR USA LLC, Cerritos, CA (US)

(*) Notice: Subject to any disclaimer, the term of this patent is extended or adjusted under 35 U.S.C. 154(b) by 0 days.

(21) Appl. No.: 15/692,276

(22) Filed: Aug. 31, 2017

(65) Prior Publication Data

US 2018/0065702 A1   Mar. 8, 2018

Related U.S. Application Data

(60) Provisional application No. 62/383,273, filed on Sep. 2, 2016.

(51) Int. Cl.
| | | |
|---|---|---|
| *B62K 15/00* | (2006.01) | |
| *B62K 3/00* | (2006.01) | |
| *B62H 1/04* | (2006.01) | |
| *B62K 21/26* | (2006.01) | |

(52) U.S. Cl.
CPC .......... *B62K 15/006* (2013.01); *B62H 1/04* (2013.01); *B62K 3/002* (2013.01); *B62K 21/26* (2013.01)

(58) Field of Classification Search
CPC ...... B62K 3/002; B62K 15/006; B62K 15/00; B62K 2700/56; Y10T 403/32327; Y10T 403/32336
See application file for complete search history.

(56) References Cited

U.S. PATENT DOCUMENTS

| 606,525 A | 6/1898 | Dunning |
|---|---|---|
| 628,433 A | 7/1899 | Finch |
| 730,622 A | 6/1903 | Milton |
| 1,297,282 A | 3/1919 | White |
| 1,345,038 A | 6/1920 | Uppling |
| 1,391,312 A | 9/1921 | Gebhardt |
| 1,534,601 A | 4/1925 | Matveyeff |

(Continued)

FOREIGN PATENT DOCUMENTS

| DE | 19711042 A1 | 9/1998 |
|---|---|---|
| FR | 0396141 | 4/1909 |

(Continued)

OTHER PUBLICATIONS

Dirt King, "Declaration of James R. Funk", Alleged public use and service in 1985; drawings and xerographic copies of photographs, Dec. 14, 2000.

(Continued)

*Primary Examiner* — Emma K Frick
(74) *Attorney, Agent, or Firm* — Knobbe, Martens, Olson & Bear LLP

(57) ABSTRACT

A variety of scooters are disclosed. In some embodiments, a scooter can include a pivot assembly that allows the scooter to move between a folded and unfolded configuration. The pivot assembly can include a knob that frees a pin from a bracket to allow the scooter to fold. Turing the knob increases compressive forces on elements of the pivot assembly to reduce rattling noise and wobbling movement when the scooter is in use. Some embodiments of the scooter can include a center stand that can be deployed from either side of the scooter deck to stabilize the scooter when the scooter is stationary. Certain embodiments have an ergonomic handgrip.

21 Claims, 26 Drawing Sheets

(56) References Cited

U.S. PATENT DOCUMENTS

| | | |
|---|---|---|
| 1,570,189 A | 1/1926 | Sturm |
| 1,614,822 A | 1/1927 | Bukolt |
| 1,653,558 A | 12/1927 | Fisher |
| 1,658,068 A | 2/1928 | White |
| 1,687,739 A | 10/1928 | Slusher |
| 1,687,953 A | 10/1928 | Starks |
| 1,701,410 A | 2/1929 | Hornquist |
| 1,714,000 A | 5/1929 | Davis |
| 1,968,975 A | 8/1934 | Upsacker et al. |
| 2,198,667 A | 4/1940 | Hagenes |
| 2,439,556 A | 4/1948 | Bancroft |
| 2,460,395 A | 2/1949 | Reid |
| 2,546,711 A | 3/1951 | Amendt |
| 3,006,659 A | 10/1961 | Krasnoff |
| 3,288,251 A | 11/1966 | Paul |
| 3,396,928 A | 8/1968 | Lay |
| 3,484,116 A | 12/1969 | Allen |
| 3,684,305 A | 8/1972 | McDonald |
| 3,876,217 A | 4/1975 | Henri |
| 3,891,225 A | 6/1975 | Sessa |
| 4,003,582 A | 1/1977 | Maurer |
| 4,033,596 A | 7/1977 | Andorsen |
| 4,088,334 A | 5/1978 | Johnson |
| 4,102,541 A | 7/1978 | Altorfer |
| 4,103,917 A | 8/1978 | Widolf |
| 4,144,822 A | 3/1979 | Roberts et al. |
| 4,166,629 A | 9/1979 | List |
| 4,169,687 A | 10/1979 | Schull |
| 4,179,134 A | 12/1979 | Atkinson |
| 4,202,559 A | 5/1980 | Piazza, Jr. |
| 4,394,029 A | 7/1983 | Holmgren |
| 4,584,735 A | 4/1986 | Garber |
| 4,707,884 A | 11/1987 | Chang |
| 4,735,392 A | 4/1988 | Farmer |
| 4,790,550 A | 12/1988 | Simpson |
| 4,795,181 A | 1/1989 | Armstrong |
| 4,799,701 A | 1/1989 | Lindau |
| 4,905,946 A | 3/1990 | Wang |
| 5,042,622 A | 8/1991 | Smith |
| 5,102,079 A | 4/1992 | Lee |
| 5,183,129 A | 2/1993 | Powell |
| 5,192,099 A | 3/1993 | Riutta |
| 5,238,082 A | 8/1993 | Stegeman et al. |
| 5,320,367 A | 6/1994 | Landis |
| 5,383,536 A | 1/1995 | Butter et al. |
| 5,437,425 A | 8/1995 | Hou |
| 5,630,633 A | 5/1997 | Dupre et al. |
| 5,692,761 A | 12/1997 | Havlovitz |
| 5,816,614 A * | 10/1998 | Kramer, Jr. .............. B62D 1/14 |
| | | 280/775 |
| 5,848,660 A | 12/1998 | McGreen |
| 5,927,733 A | 7/1999 | Banda |
| 5,938,223 A | 8/1999 | Kotlier |
| 5,992,566 A | 11/1999 | Yeh |
| 6,120,044 A | 9/2000 | Tsai |
| 6,139,035 A | 10/2000 | Tsai |
| D435,873 S | 1/2001 | Lee |
| 6,179,307 B1 | 1/2001 | Mao |
| 6,182,988 B1 | 2/2001 | Wu |
| D438,912 S | 3/2001 | Barrera |
| D439,623 S | 3/2001 | Barrera |
| 6,206,387 B1 | 3/2001 | Tsai |
| 6,234,501 B1 | 5/2001 | Chen |
| D446,259 S | 8/2001 | Udwin et al. |
| D447,187 S | 8/2001 | Powers |
| 6,270,095 B1 | 8/2001 | Chang |
| 6,276,701 B1 | 8/2001 | Chen |
| 6,298,952 B1 | 10/2001 | Tsai |
| D452,284 S | 12/2001 | McGinnis |
| 6,332,621 B1 | 12/2001 | Wu |
| 6,378,880 B1 | 4/2002 | Lin |
| 6,390,483 B1 * | 5/2002 | Hsu .............. B62K 3/002 |
| | | 280/87.041 |
| 6,409,190 B1 | 6/2002 | Tsai |
| 6,428,021 B1 * | 8/2002 | Tung .............. B62K 3/002 |
| | | 280/87.041 |
| 6,431,567 B2 | 8/2002 | Tsai |
| 7,011,319 B2 * | 3/2006 | Lu .............. B62K 3/002 |
| | | 280/87.041 |
| 7,063,341 B2 | 6/2006 | Tsai |
| 7,156,405 B1 | 1/2007 | Ming |
| 7,407,172 B2 | 8/2008 | Ka Ming |
| 7,419,171 B2 | 9/2008 | Ka Ming |
| 7,559,561 B2 | 7/2009 | Tsai |
| 7,584,974 B2 | 9/2009 | Jackman |
| 7,976,035 B2 | 7/2011 | Chan |
| D654,963 S | 2/2012 | Powers et al. |
| 8,157,275 B2 | 4/2012 | Tsai |
| 8,292,018 B2 * | 10/2012 | Huang .............. B60B 19/00 |
| | | 180/220 |
| D671,600 S | 11/2012 | Horne |
| D684,217 S | 6/2013 | Hadley |
| 8,474,840 B2 | 7/2013 | Tsai |
| D691,671 S | 10/2013 | Chen et al. |
| D692,963 S | 11/2013 | Radtke et al. |
| 8,870,200 B2 | 10/2014 | Chen |
| D717,881 S | 11/2014 | Radtke et al. |
| 8,925,935 B2 | 1/2015 | Powers et al. |
| 8,998,224 B2 | 4/2015 | Ngai |
| 9,422,021 B2 | 8/2016 | Tsai |
| 9,862,449 B2 | 1/2018 | Xu |
| D815,215 S | 4/2018 | Desberg |
| D818,541 S | 5/2018 | Huang |
| 9,969,456 B2 | 5/2018 | Tsai |
| 10,093,380 B2 | 10/2018 | Gotfrid |
| D836,727 S | 12/2018 | Wilson et al. |
| D837,303 S | 1/2019 | Desberg |
| 2002/0050696 A1 | 5/2002 | Lan |
| 2002/0093161 A1 | 7/2002 | Udwin et al. |
| 2003/0067132 A1 | 4/2003 | Lin |
| 2004/0129472 A1 * | 7/2004 | Cheng .............. B62K 3/002 |
| | | 180/181 |
| 2005/0073121 A1 * | 4/2005 | Chen .............. B62K 3/002 |
| | | 280/87.05 |
| 2006/0103096 A1 * | 5/2006 | Chen .............. B62K 3/002 |
| | | 280/87.05 |
| 2009/0230648 A1 * | 9/2009 | Chan .............. B62K 3/002 |
| | | 280/87.041 |
| 2009/0278327 A1 | 11/2009 | Chan |
| 2013/0087983 A1 | 4/2013 | Ngai |
| 2013/0320648 A1 | 12/2013 | Eckert et al. |
| 2017/0043837 A1 | 2/2017 | Tsai |
| 2018/0186424 A1 * | 7/2018 | Sung .............. B62K 15/006 |

FOREIGN PATENT DOCUMENTS

| | | |
|---|---|---|
| GB | 699673 A | 11/1953 |
| WO | WO 2018/045218 A1 | 3/2018 |

OTHER PUBLICATIONS

International Search Report and Written Opinion in corresponding International Patent Application No. PCT/US2017/049706, dated Jan. 2, 2018, in 10 pages.
Sharper Image Catalogue, Aug. 1998.
Tranz X drawings, 1998.
Photographs or advertisements relating to "K2" scooter, date unknown.
Photos or advertisements relating to "Rollerboard" scooter, date unknown.
International Preliminary Report on Patentability in corresponding International Patent Application No. PCT/US2017/049706, dated Mar. 5, 2019, in 6 pages.

* cited by examiner

ANTI-RATTLE FOLDING SCOOTER

CROSS REFERENCE

This application claims the priority benefit under at least 35 U.S.C. § 119 of U.S. Provisional Patent Application No. 62/383,273, filed Sep. 2, 2016, the entirety of which is incorporated by reference herein. This application also incorporates by reference the entirety of U.S. Design Application No. 29/577,036, filed Sep. 8, 2016.

BACKGROUND

Field

This disclosure generally relates to personal mobility vehicles, such as scooters.

Description of Certain Related Art

The use of scooters has become a popular recreational activity as well as useful means of personal transportation. Scooters have become popular among many age groups and there are many different scooter variations and scooter designs. Scooters can have at least two wheels and a steering mechanism. To ride the scooter, a user typically stands on a deck of the scooter and holds onto the steering mechanism. To propel the scooter, a user may keep one foot on the scooter deck and, with the other foot, push off from the ground to force the scooter forward.

SUMMARY OF CERTAIN FEATURES

Certain scooters have a pivot assembly that allows a fore portion of the scooter to be folded over an aft portion of the scooter. This can allow the scooter to have a reduced overall size. Certain configurations can ease storing and/or carrying the scooter. Some pivot assemblies can be somewhat loose when the scooter is in the unfolded and/or riding configuration, making the scooter rattle and/or wobble during use. These rattling noises and wobbling movements can detract from the appeal of the scooter.

Some scooters have a kickstand that allows the scooter to remain upright when not in use. Some kickstands for scooters are mounted on one side of the scooter deck. To employ the kickstand, a user often dismounts the scooter, holds onto a portion (e.g., handgrips) of the scooter, and pushes by foot the kickstand to swing the kickstand away from the side of the deck. The scooter can then be tilted onto the kickstand so that the kickstand holds the scooter in an upright position. To disengage the kickstand, a user can hold onto the scooter, kick the kickstand to swing the kickstand up to the side of the deck, and then step onto the scooter deck. Use of such kickstands may require the user to operate the kickstand according to the side of the deck on which the kickstand is mounted. Some users may feel more comfortable employing or disengaging the kickstand from the other side (e.g., left or right) of the scooter and/or prefer to be able to choose and/or alternate sides. Some kickstands may require the user to dismount the scooter to engage or disengage the kickstand.

Certain scooters have handgrips that enhance the gripping ability or comfort of the user. Some handgrips are substantially cylindrical and are positioned on either side of the handlebar assembly. The handgrip may include on its outer surface multiple indentations that are spaced apart from one another. The indentations can allow a user to lay each finger in a separate indentation when gripping the handgrip. The substantially cylindrical shape of some handgrips can be unpleasant after prolonged gripping. Some users may find cylindrical handgrips to have a dated and/or unfashionable appearance.

Various embodiments of personal mobility vehicles, such as scooters, are disclosed that address one or more of the aforementioned problems, or other problems. Some embodiments of the present disclosure relate to a pivot assembly that can help to reduce the rattling noises and/or reduce the wobbling movements of the scooter. Some embodiments of the present disclosure relate to a support assembly for a scooter that can allow the kickstand to be accessed from either side of the scooter. Some embodiments of the present disclosure relate to a handgrip for a scooter that enhances the aesthetics and/or ergonomics of the handgrip.

According to some embodiments, a scooter can include a handlebar assembly, a deck, and a pivot assembly. The pivot assembly can couple the handlebar assembly to the deck. The pivot assembly can include a support assembly, a knob, a brace portion, and a shaft. The support assembly can be pivotably coupled to a bracket by a rod. The bracket can include a rail surface. The rail surface can include a first receiving region spaced apart from a second receiving region. The rail surface can include an intermediate portion disposed between the first and second receiving regions. The intermediate portion can be disposed a first distance away from the rod. The first distance can be greater than a distance between the rod and the first or second receiving regions. The knob can be coupled to a pin by a collar. The knob can slide the pin radially away from the rod. The brace portion can extend across a face of the support assembly. The shaft can pass through the collar. A first end of the shaft can be attached to the knob. A second end of the shaft can be opposite the first end. The knob can be configured so that rotation of the knob in a first rotational direction moves the second end into engagement with the brace portion, thereby inhibiting movement of the handlebar assembly relative to the deck.

In some embodiments, the knob can advance longitudinally toward the support assembly as the knob is rotated in the first rotational direction. In some embodiments, the knob can remain longitudinally fixed relative to the support assembly as the knob is rotated in the first rotational direction. In some embodiments, the scooter can include a foot disposed between the second end of the shaft and the brace portion. In some embodiments, one of the foot and the brace portion can include a protrusion. The other of the foot and the brace portion can include a recess. The protrusion can fit inside of the recess and inhibit rotation of the foot relative to a longitudinal axis of the shaft.

In some embodiments, the bracket can include a first lateral portion and a second lateral portion. The support assembly can be disposed between the first and second lateral portions. In some embodiments, the first receiving region can include an anterior first receiving region and a posterior first receiving region. The anterior first receiving region can be disposed on the first lateral portion. The posterior first receiving region can be disposed on the second lateral portion. In some embodiments, the second receiving region can include an anterior second receiving region and a posterior second receiving region. The anterior second receiving region can be disposed on the first lateral portion. The posterior second receiving region can be disposed on the second lateral portion. In some embodiments, the pin can include an anterior portion and a posterior portion. The anterior portion of the pin can contact at least a portion of the first lateral portion. A posterior portion of the pin can contact at least a portion of the second lateral portion.

According to some embodiments, a retractable support for a scooter can include a mounting assembly, a base portion, a first ear portion, and a second ear portion. The mounting assembly can be attached to a deck of the scooter. The base portion can be pivotably attached to the mounting assembly. The base portion can be substantially perpendicular to a longitudinal axis of the scooter. The first ear portion can be coupled to the base portion and extend laterally beyond a first side of the deck. The second ear portion can be coupled to the base portion and extend laterally beyond a second side of the deck. The second side can be opposite the first side.

In some embodiments, the mounting assembly can move the base portion between a retracted position and a deployed position. In some embodiments, in the retracted position, the ear portion is further from the ground than is at least a portion of the base portion. In some embodiments, in the retracted position, the mount assembly is further from the ground than is at least a portion of the base portion. In some embodiments, the support can include a cushioning feature disposed on at least a portion of the ear portion. In some embodiments, the support can include a cushioning feature disposed on at least a portion of the base portion. In some embodiments, a front wheel of the scooter on which the retractable support is mounted can be lifted from the ground when the retractable support is in the deployed position.

According to some embodiments, an ergonomical handgrip can include a front surface and a rear surface. The front surface can be coupled to a top surface by a first intervening surface. The rear surface can be coupled to the top surface by a second intervening surface. The top surface can be convex. The second intervening surface can be substantially parallel to the front surface.

In some embodiments, the handgrip can have a substantially triangular shape when viewed along a longitudinal axis of the handgrip. In some embodiments, in use an apex of the substantially triangular shape is closer to the ground than is any other portion of the substantially triangular shape. In some embodiments, in use a side of the substantially triangular shape is farther from the ground than is any other portion of the substantially triangular shape.

BRIEF DESCRIPTION OF THE DRAWINGS

Certain features, aspects, and advantages of the subject matter disclosed herein are described below with reference to the drawings, which are intended to illustrate, and not to limit, the scope of the disclosure. Various features of different disclosed embodiments can be combined to form additional embodiments, which are part of this disclosure. No structures, features, steps, or processes are essential or critical; any can be omitted.

DETAILED DESCRIPTION OF CERTAIN EMBODIMENTS

Reference will now be made in detail to the embodiments of the present technology. While numerous specific embodiments of the present technology will be described in conjunction with the alternative embodiments, it will be understood that they are not intended to limit the present technology to these embodiments. Instead, these described embodiments of the present technology are intended to cover alternatives, modifications and equivalents. Furthermore, in the following description, detailed numerous specific details are set forth in order to provide a thorough understanding of the present technology. However, it will be recognized by one of ordinary skill in the art that embodiments may be practiced without these specific details.

Overview

Figure 1A:
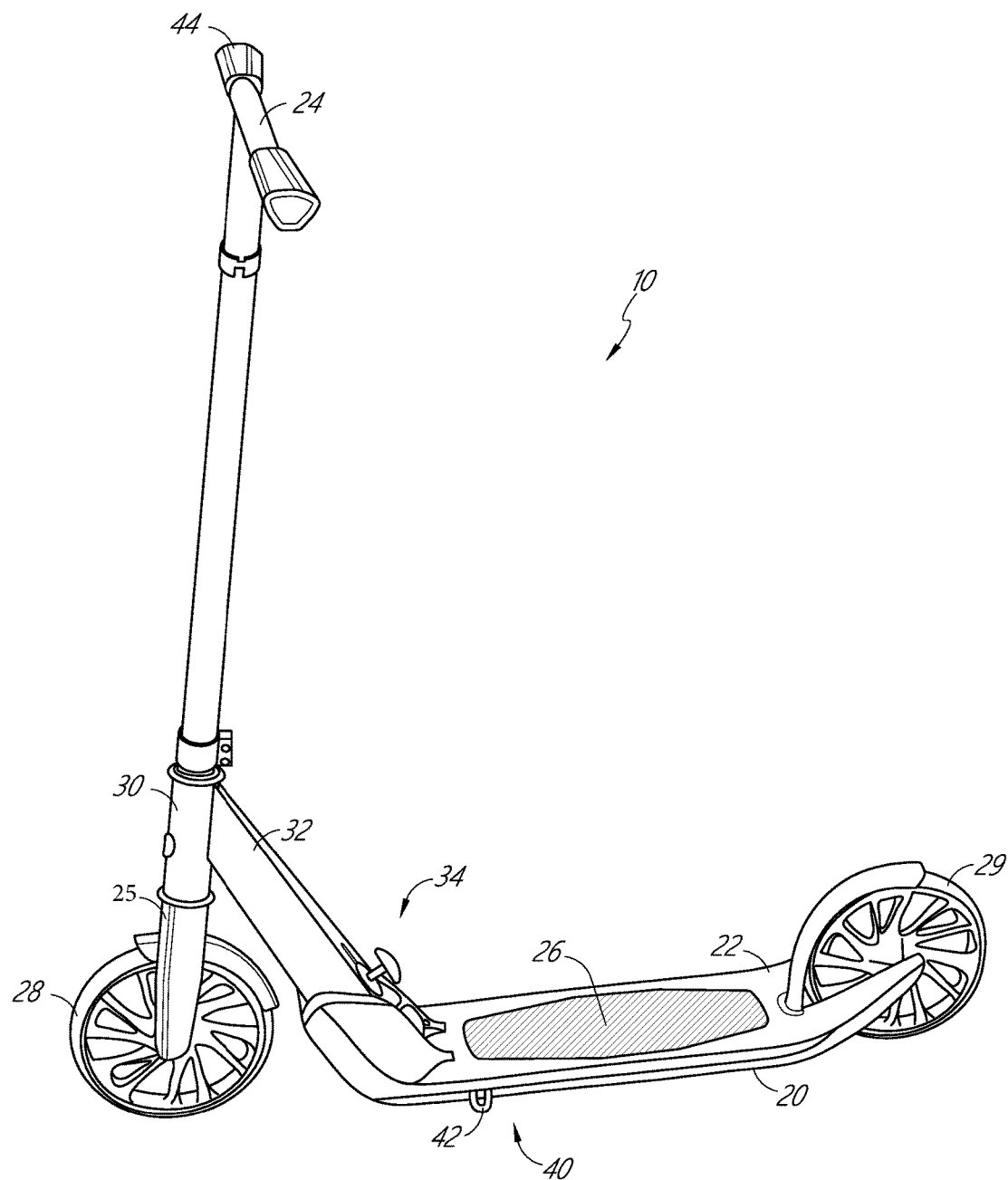
FIG. 1A illustrates a perspective view of an embodiment of a scooter.
Figure 1B:
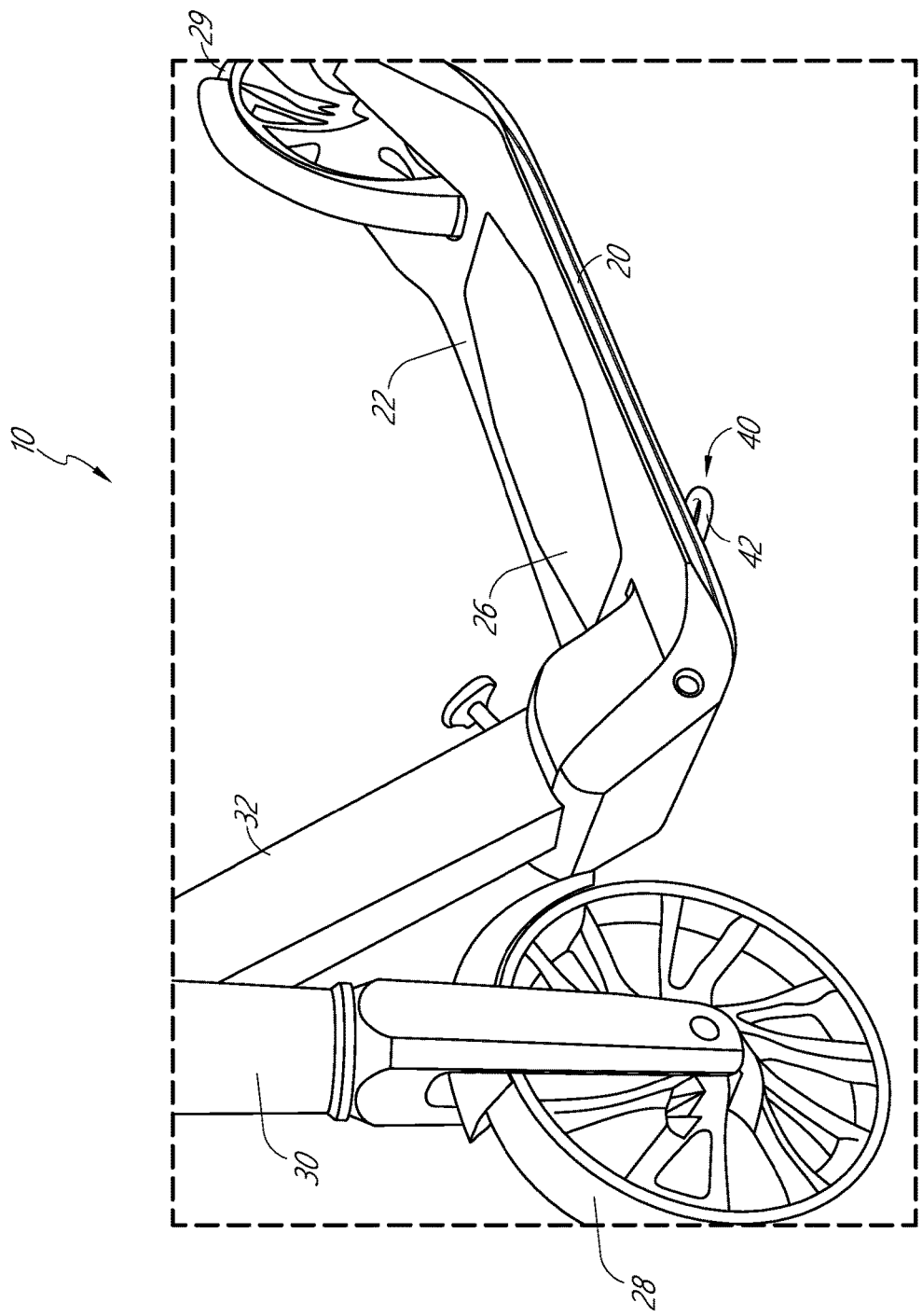
FIG. 1B illustrates another perspective view of the scooter of FIG. 1.

FIGS. 1A and 1B show a scooter 10 having certain features, aspects and advantages of the present disclosure. The scooter 10 can include a scooter body 20. The scooter body 20 can include a deck 22 and a handlebar assembly 24. In some embodiments, the deck 22 can include an upper surface 22. The upper surface of the deck 22 can include a foot rest surface 26. The foot rest surface 26 can support at least one foot or two feet of a user. In some embodiments, the foot rest surface 26 can support the user when the user is standing. In some embodiments, the footrest surface 26 can include a gripping region. In some embodiments, the gripping region can help to inhibit or prevent slipping of the user's foot or feet.

In some embodiments, the scooter 10 can include at least one front wheel 28 and/or at least one rear wheel 29. The at least one front wheel 28 and/or the at least one rear wheel 29 can be supported by the scooter body 20. In some embodiments, the front wheel 28 and/or the rear wheel 29 can be spaced apart from one another with the deck 22 extending therebetween. In some embodiments, the rear wheel 29 can be connected to the deck 22. As shown, at least a portion of the rear wheel 29 can extend within at least a portion of the deck 22. In some embodiments, a rear end of the deck 22 is connected with an axle of the rear wheel 29. In some embodiments, the rear end of the deck 22 is tapered. In some embodiments, the rear end of the deck 22 is narrower than a front end of the deck 22. In some embodiments, the rear end of the deck 22 extends upwardly towards a center of the rear wheel 29. In such configurations, the foot rest surface 26 can be positioned below the rear wheel axle. In some embodiments, the rear wheel 29 can include a rear wheel guard. The rear wheel guard can protect the rear wheel 29 from bumps, rocks, and/or dirt, among other materials.

Figure 2A:
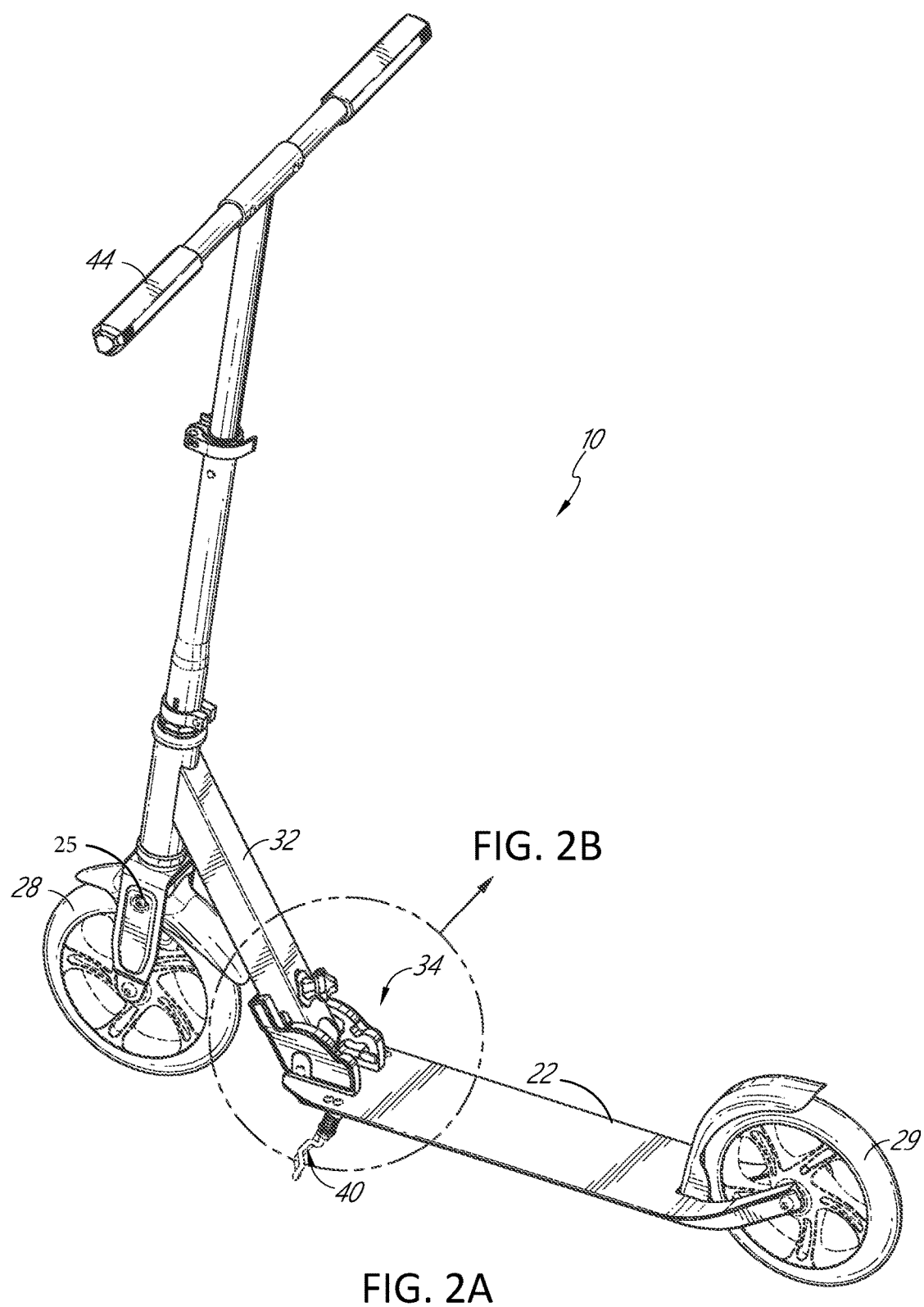
FIG. 2A illustrates a top, rear, left-side perspective view showing an embodiment of a scooter.
Figure 2B:
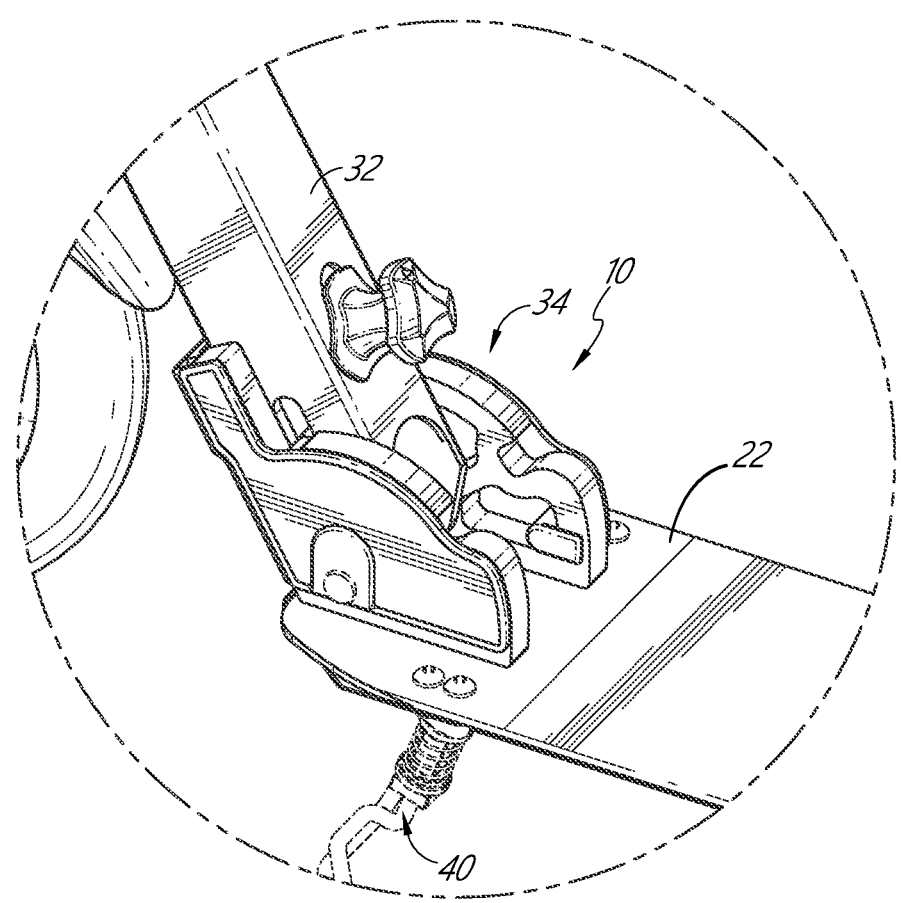
FIG. 2B illustrates a close-up view of a portion of the scooter of FIG. 2A.

In some embodiments, the wheels 28, 29 can be generally aligned in the same plane when the wheels 28, 29 are in a neutral position (e.g., FIGS. 1 and 2B). In some embodiments, the wheels 28, 29 are in the neutral position when the wheels 28, 29 face in generally the same direction. In some embodiments, the wheels 28, 29 are biased to the neutral position. In some embodiments, the rear wheel 29 is fixed and/or can rotate about an axis other than the rolling axis. In some embodiments, the front wheel 28 is fixed and/or can rotate about an axis other than the rolling axis. In some embodiments, the wheels 28, 29 can be located at opposite ends of the deck 22 (e.g., near fore and/or aft regions of the scooter 10). In some embodiments, the wheels 28, 29 can include plastic, metal, and/or rubber, among other materials.

In some embodiments, the scooter 10 can include a head tube 30. The head tube 30 can rotatably support the handlebar assembly 24. In certain embodiments, the handlebar assembly 24 can rotate within the head tube 30 and/or the head tube 30 can rotate about the steering assembly 24. Further details related to the rotatable connection between the head tube 30 and the handlebar assembly 24, among other aspects of the head tube 30 are described in U.S. application Ser. No. 15/409,488 filed on Jan. 18, 2017 and U.S. Pat. No. 8,870,200, each of which is incorporated herein by reference in its entirety.

In some embodiments, the front wheel 28 can be operatively coupled to the handlebar assembly 24 so that a user can steer the front wheel 28 by moving the handlebar assembly 24. In some embodiments, the handlebar assembly 24 can be connected to the front wheel 28 by a steering assembly having a front fork 25. In some embodiments, the front fork 25 can extend over at least a portion of the front wheel 28. For example, in some embodiments, the front fork 25 connects to an axle of the front wheel 28. Such configurations can allow the front wheel 28 to rotate within the front fork 25. In some embodiments, the front fork 25 can surround a front wheel guard. The front wheel guard can surround at least a portion of the front wheel 28. The front wheel guard can protect the front wheel 28 from bumps, rocks, and/or dirt, among other materials.

In some embodiments, a height of the handlebar assembly 24 can be adjusted by sliding one or more telescoping portions of the handlebar assembly 24 relative to one another in a direction toward or away from the deck 22. In some embodiments, the scooter body 20 can include a support assembly 32. The support assembly 32 can connect the head tube 30 to the deck 20. In some embodiments, the support assembly 32 can extend between the head tube 30 and the deck 22. In some embodiments, the support assembly 32 can be positioned between the head tube 30 and the deck 22.

In some embodiments, the scooter 10 can include a pivot assembly 34. The pivot assembly 34 can allow the support assembly 32 and/or the head tube 30 to rotate with respect to the scooter body 20. As shown, the pivot assembly 34 can be located at the support assembly 32. In certain variants, the pivot assembly 34 can be positioned at the head tube 30 and/or the handlebar assembly 24.

As described in more detail below, the scooter 10 can include a support element 40, also referred to herein as a center stand 40. The center stand 40 can be mounted to the scooter body 20. In some embodiments, the center stand 40 can be mounted to a lower side of the foot rest surface 26 (e.g., underneath the foot rest surface 26). In some embodiments, the center stand 40 can include an ear portion 42. The ear portion 42 can extend laterally beyond the deck 22.

In certain embodiments, the scooter 10 can include a hand grip 44, as described in more detail below. The hand grip 44 can be disposed on either end of the handlebar assembly 24. As described in more detail below, the hand grip 44 can be ergonomically shaped, such as being generally triangular in shape, among other shapes.

Pivot Assembly

Figure 2C:
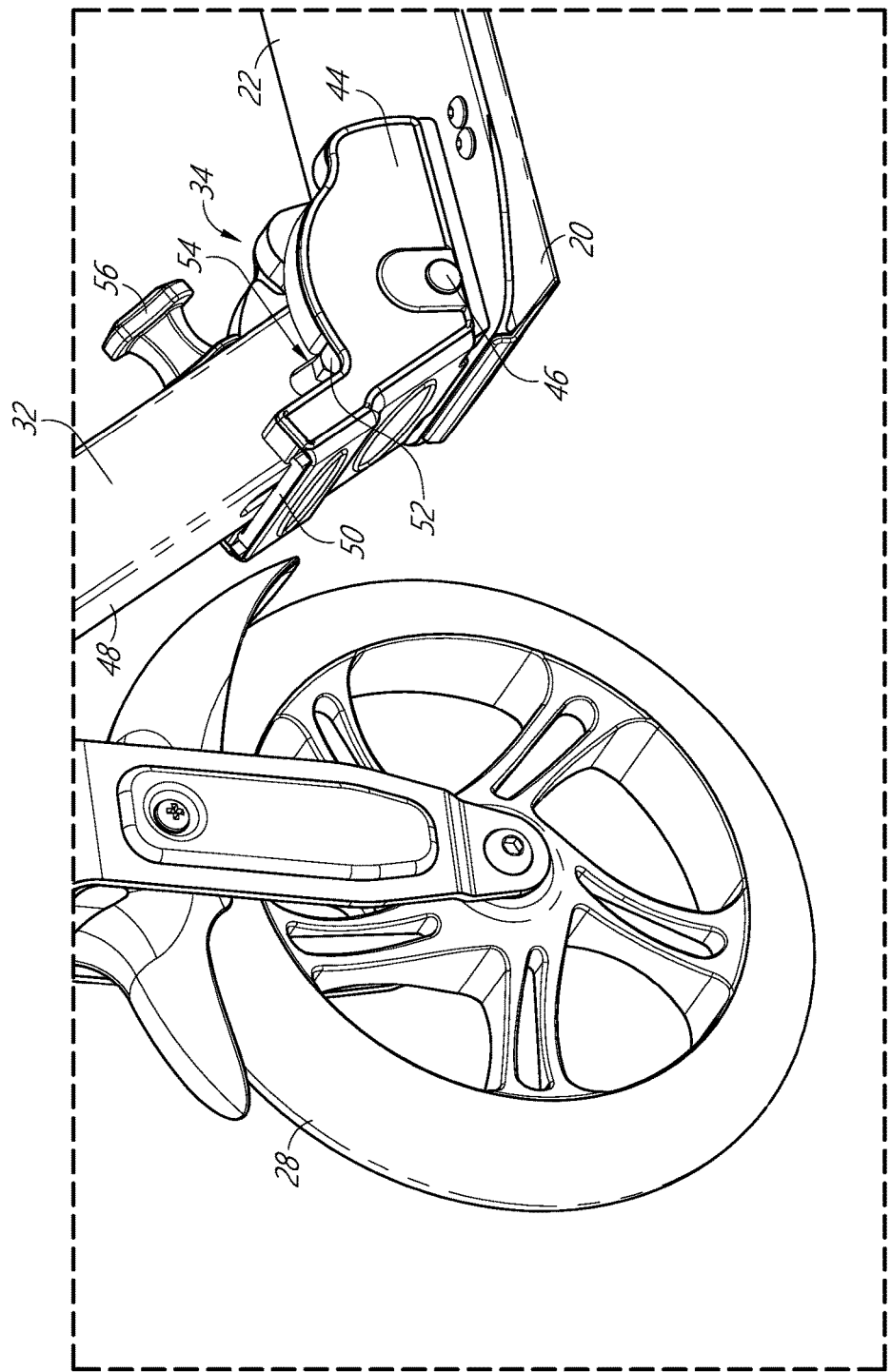
FIG. 2C illustrates another close-up view of the scooter of FIG. 2A, showing a front portion of the scooter.
Figure 2D:
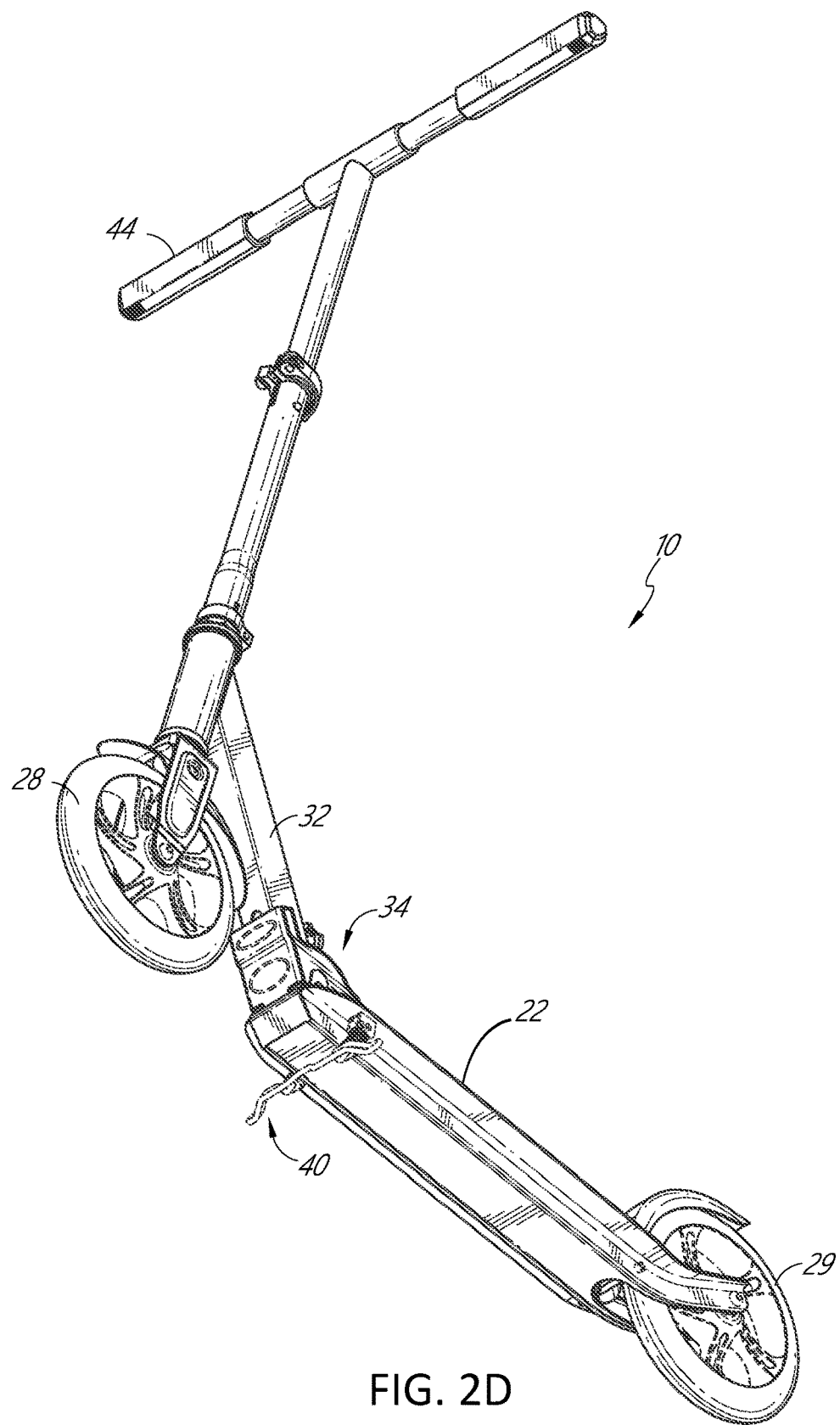
FIG. 2D illustrates a bottom, front, left-side view of the scooter of FIG. 2A.
Figure 2E:
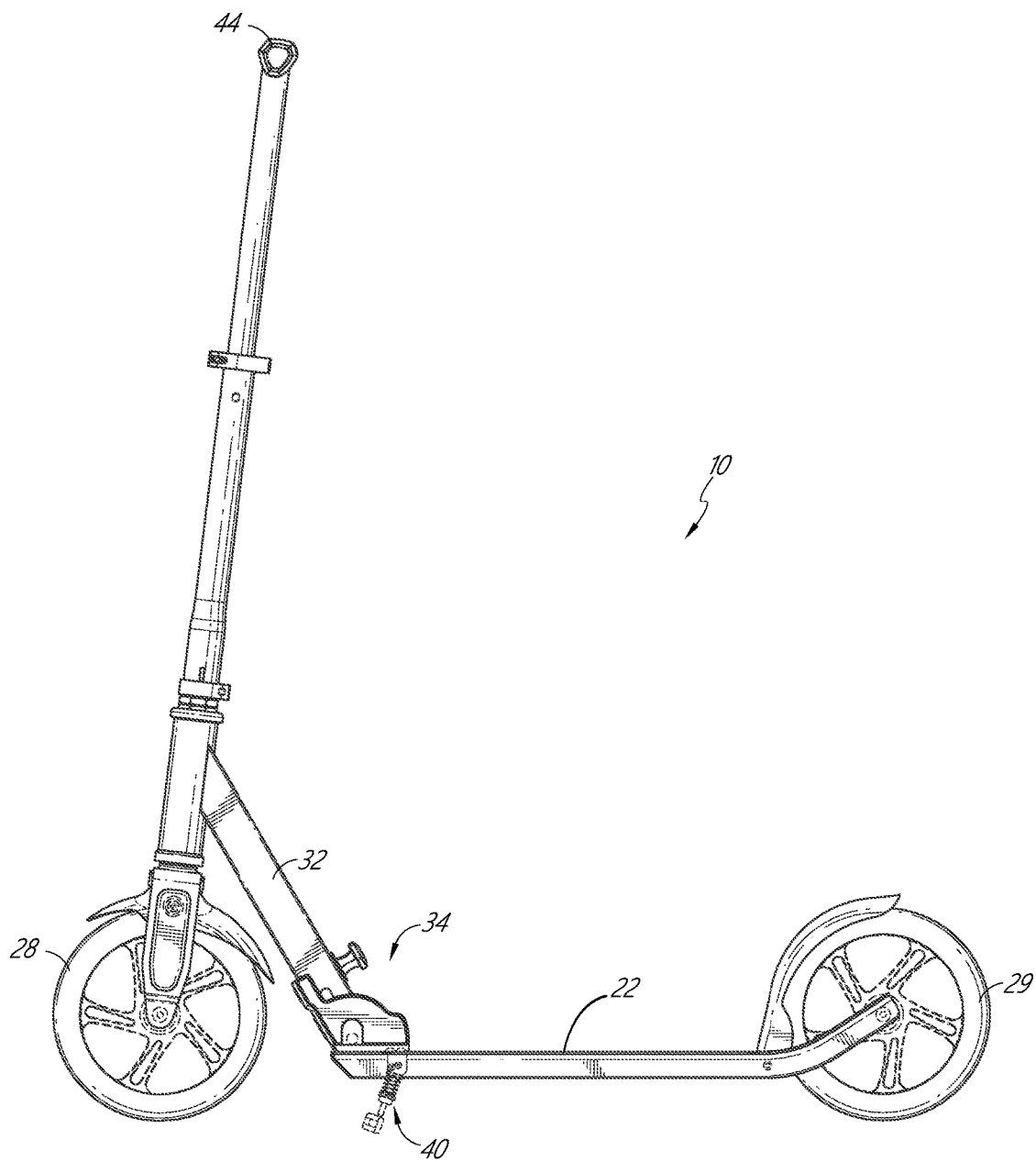
FIG. 2E illustrates a left-side view of the scooter of FIG. 2A.
Figure 2F:
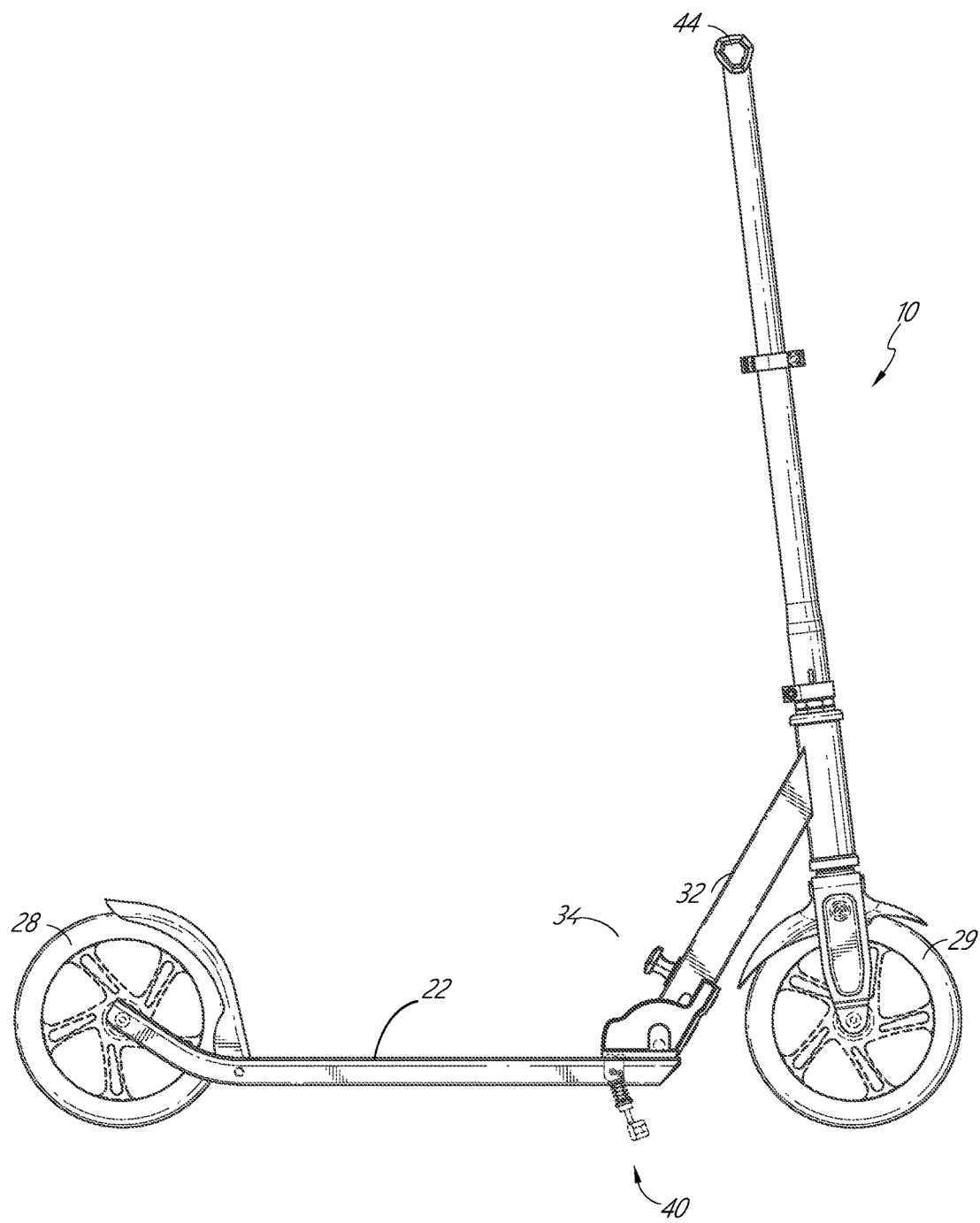
FIG. 2F illustrates a right-side view of the scooter of FIG. 2A.
Figure 2G:
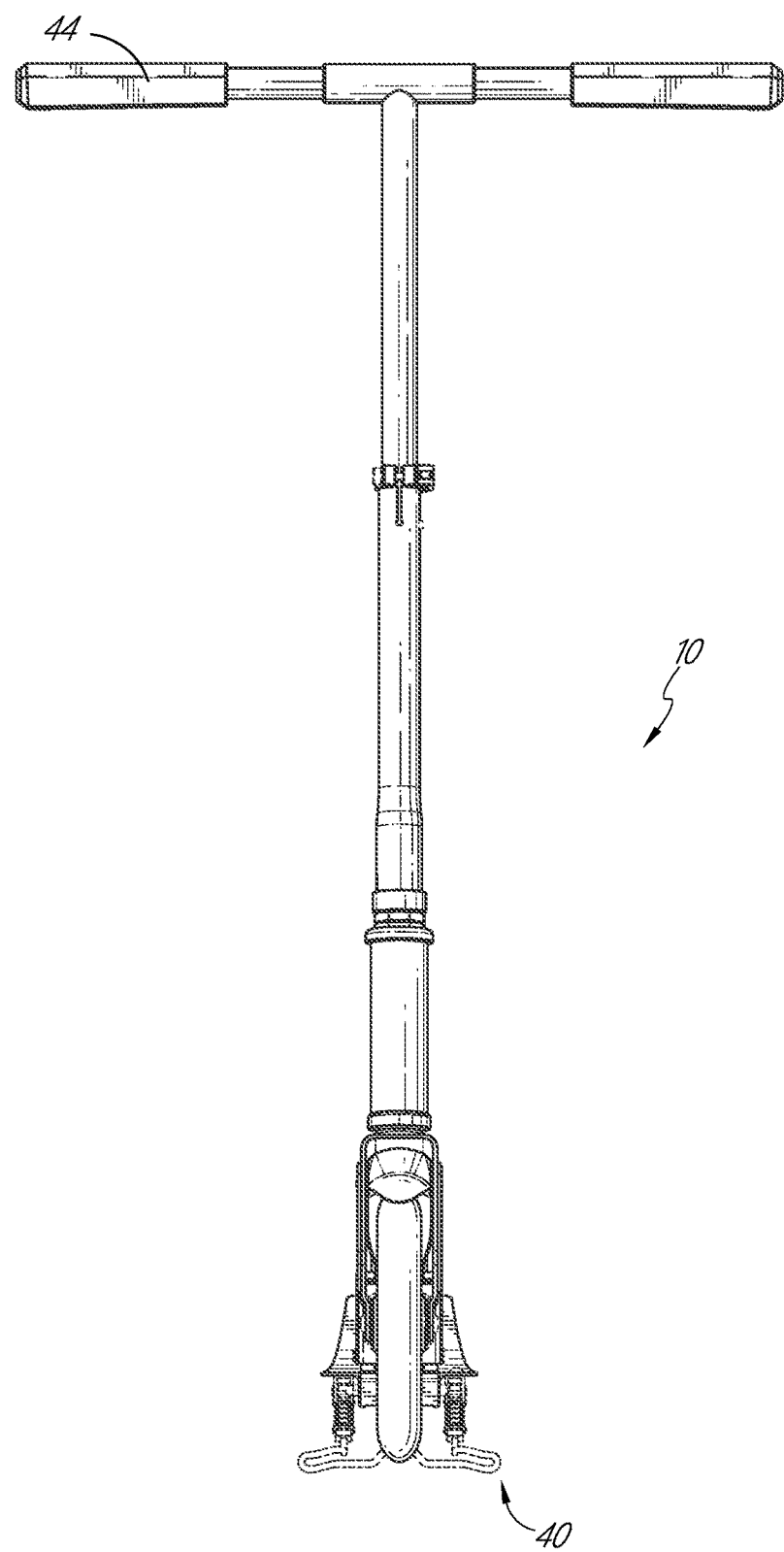
FIG. 2G illustrates a front view of the scooter of FIG. 2A.
Figure 2H:
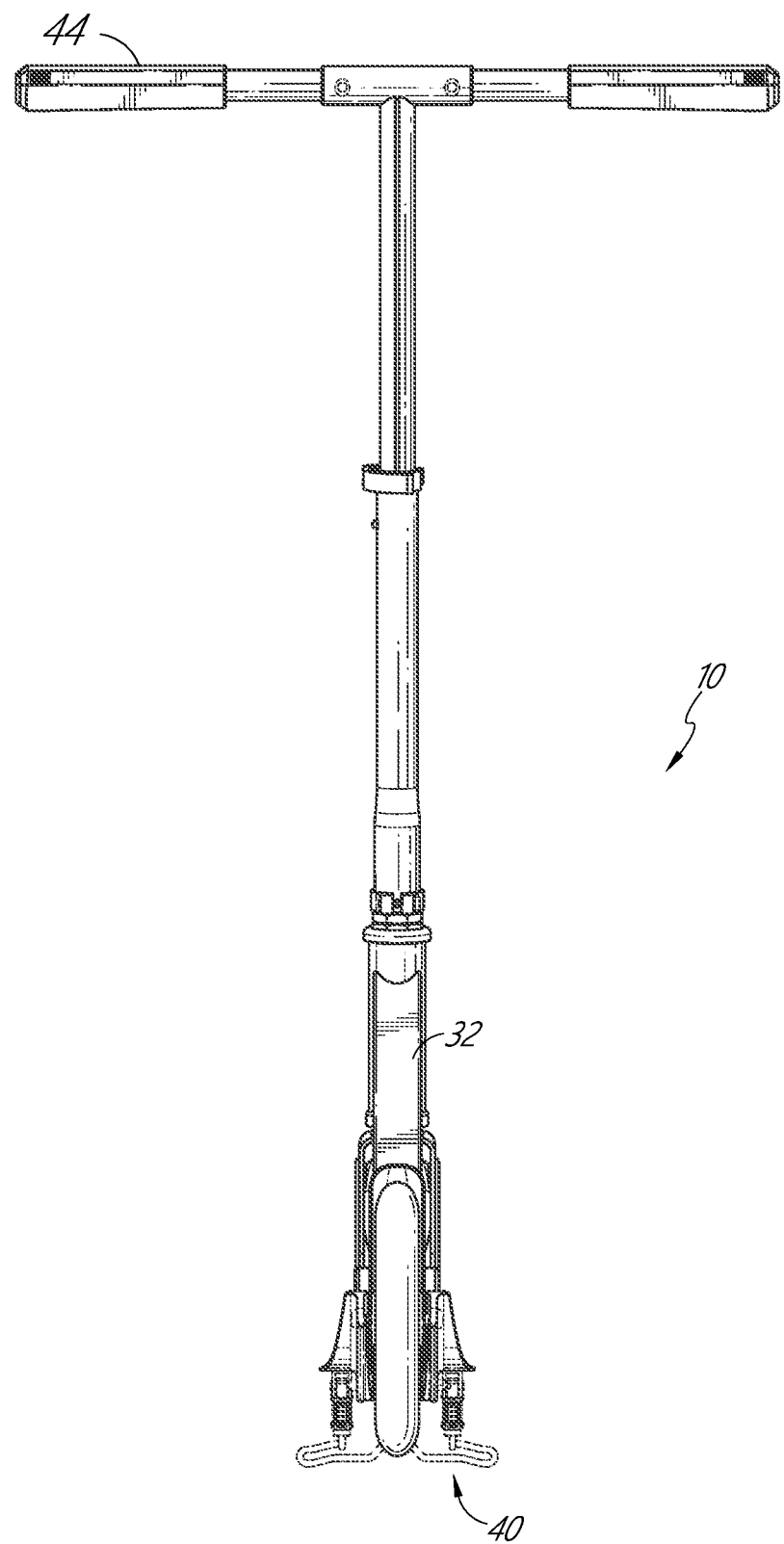
FIG. 2H illustrates a rear view of the scooter of FIG. 2A.
Figure 2I:
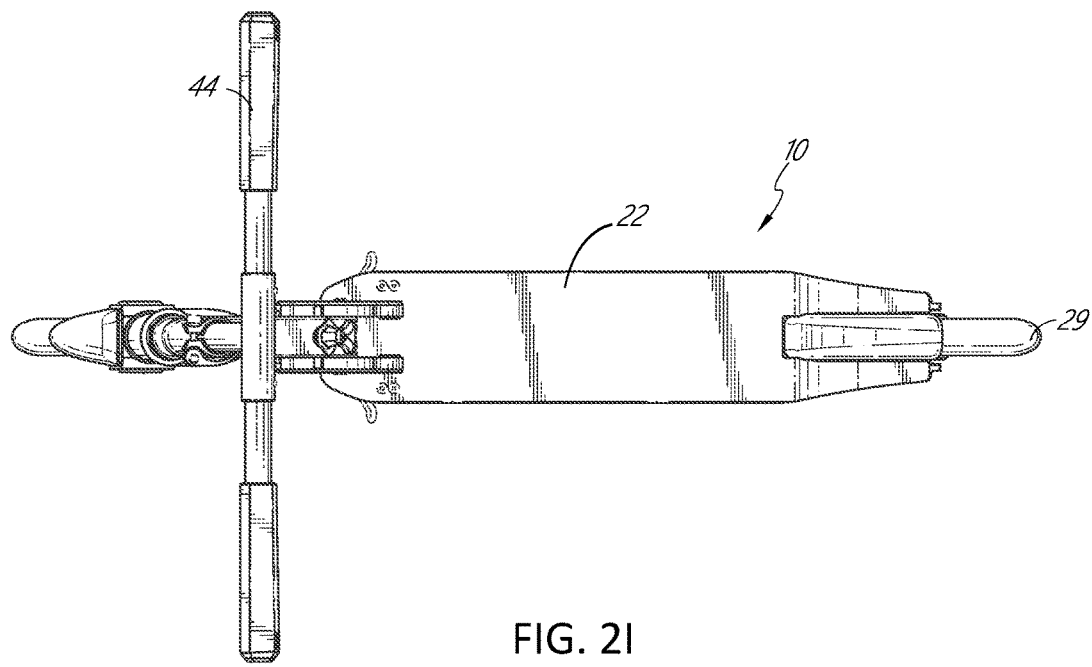
FIG. 2I illustrates a top view of the scooter of FIG. 2A.
Figure 2J:
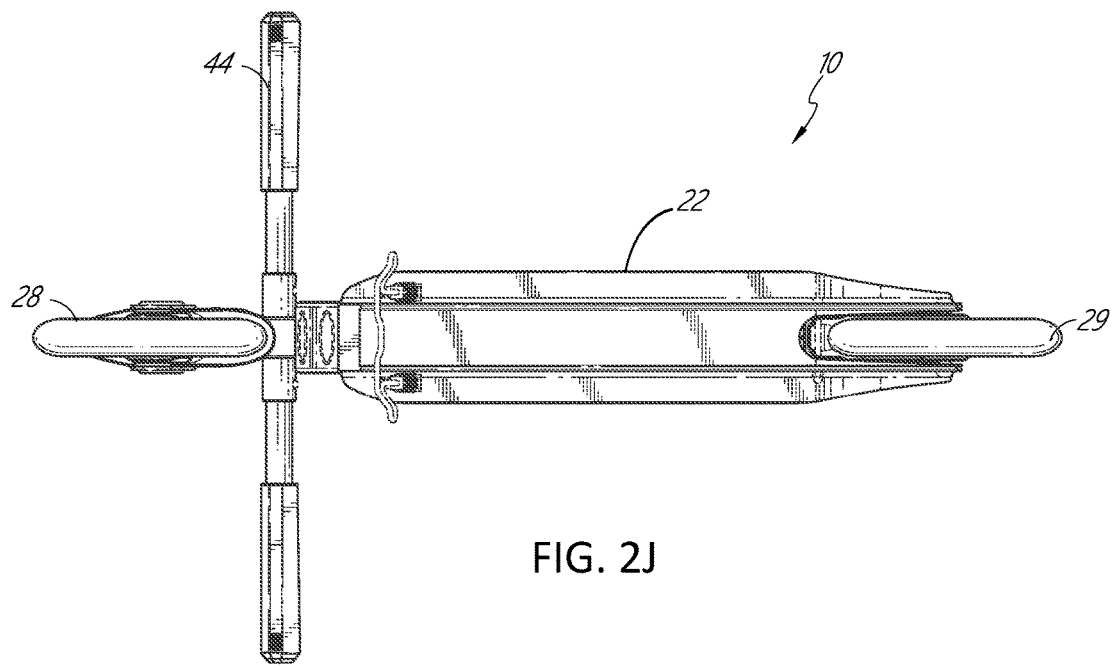
FIG. 2J illustrates a bottom view of the scooter of FIG. 2A.

FIGS. 2A-2J illustrate another embodiment of the scooter 10. FIGS. 2B and 2C illustrate a non-limiting, illustrative embodiment of the pivot assembly 34. The pivot assembly 34 can be used with any of the embodiments of the scooters 10 described and/or shown herein. The pivot assembly can allow any of the scooters 10 described and/or shown herein to fold and/or unfold.

In some embodiments, the pivot assembly 34 can include a bracket 44. The bracket 44 can be mounted onto the deck 22 of the scooter body 20. In some embodiments, a rod 46 can pass through at least a portion of the bracket 44 and/or through at least a portion of the support assembly 32. In some embodiments, the support assembly 32 can rotate about the rod 46. In some configurations, the rod 46 and the bracket 44 can create a pivot about which the support assembly 32 can rotate relative to the deck 22.

The support assembly 32 can have a front face 48 that faces in a generally forward direction (e.g., towards the front wheel 28 of the scooter 10). In some embodiments, the bracket 44 can have a brace portion 50 that extends across the front face 48 of the support assembly 32 and/or supports the front face 48, such as when the support assembly 32 can be in the unfolded configuration. For the sake of clarity, the direction of rotation which brings the support assembly 32 toward the brace 50 will be referred to as the "fore" rotational direction. The direction of rotation which brings the support assembly 32 away from the brace 50 will be referred to as the "aft" rotational direction. As can be seen in at least FIGS. 2B and 2C, the brace portion 50 can limit the amount of fore rotation of the support assembly 32. In some embodiments, the brace portion 50 can support the support assembly 32 when the scooter 10 is in the unfolded (e.g., riding) configuration.

In some embodiments, the brace 50 can include an upper portion and a lower portion. In some embodiments, the upper portion can extend outwardly in the fore direction a greater distance than the lower portion of the brace 50. In some embodiments, the upper portion can extend outwardly in the fore direction the same distance as the lower portion. In some embodiments, upper and/or the lower portions can sit flush against one another and/or form a generally flat surface. In some embodiments, a ledge of the brace 50 is approximately aligned with an axis of rotation of the front wheel. In some embodiments, a ledge of the brace 50 is positioned approximately below a top of the front wheel. In some embodiments, a ledge of the brace 50 is positioned approximately above the axis of rotation of the front wheel.

In some embodiments, the pivot assembly 34 can include a pin 52. The pin 52 can extend from the support assembly 32 and into a fore slot 54 of the bracket 44. In some embodiments, the pin 52 can extend between the support assembly 32 and the fore slot 54. In some embodiments, the pin 52 can generally prevent the support assembly 32 from rotating toward and/or away from the deck 22 when the pin 52 is seated in the fore slot 54. In some embodiments, the pin 52 can generally prevent the support assembly 32 from rotating toward and/or away from the deck 22 by more than 1 to 2 degrees, 2 to 3 degrees, 3 to 4 degrees, 4 to 5 degrees, 5 to 6 degrees, 6 to 7 degrees, 7 to 8 degrees, 8 to 9 degrees, 9 to 10 degrees, degrees between the aforementioned rotation degrees, or other degrees. Some configurations can hold the scooter 10 in an unfolded configuration. As discussed in more detail below, the pivot assembly 34 can include a knob 56. The knob 56 can be adapted to move the pin 52. In the some embodiments, the knob 56 can slide the pin 52 along the support assembly 32 radially away from the rod 46. Such configurations can free the pin 52 from the fore slot 54 of the bracket 44. In some embodiments, when the pin 52 exits at least a portion of or all of the fore slot 54, the support assembly 32 can rotate about the rod 46.

Figure 3:
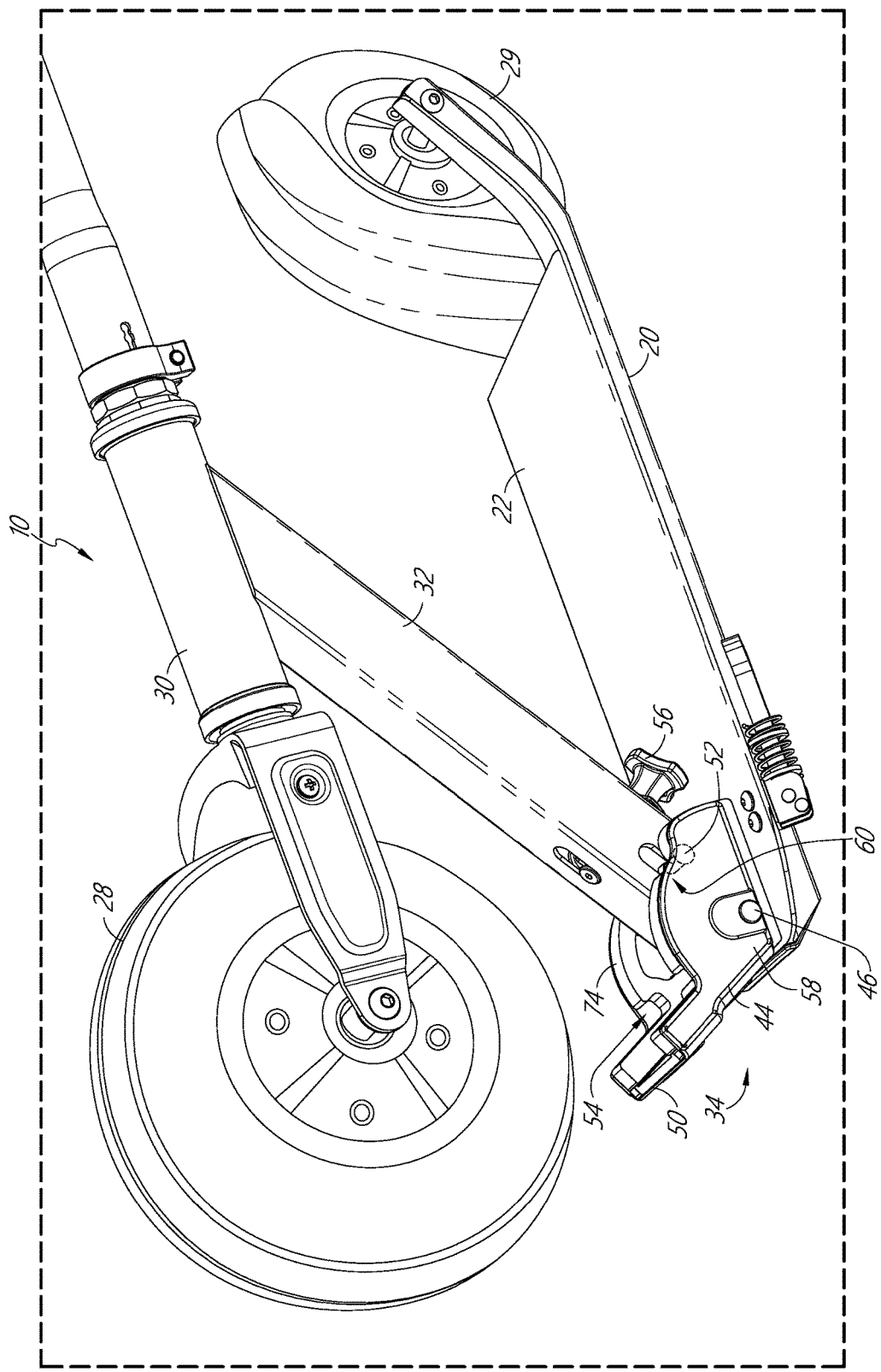
FIG. 3 illustrates a perspective view of an embodiment of a scooter in a folded configuration.

FIG. 3 depicts an embodiment of the scooter 10 in a folded configuration. In some embodiments, the bracket 44 can include a side face 58. In some embodiments, the side face 58 can be solid (e.g., FIG. 1). In some embodiments, the side face 58 can be generally transparent (e.g., FIG. 3). In some embodiments, the pin 52 can be positioned in at least a portion of or all of an aft slot 60 of the bracket 44 when the scooter 10 is in the folded configuration. In some embodiments, the pin 52 can generally prevent the support assembly 32 from rotating toward and/or away from the deck 22 when the pin 52 is seated in the aft slot 60. In some embodiments, the pin 52 can generally prevent the support assembly 32 from rotating toward and/or away from the deck 22 by more than 1 to 2 degrees, 2 to 3 degrees, 3 to 4 degrees, 4 to 5 degrees, 5 to 6 degrees, 6 to 7 degrees, 7 to 8 degrees, 8 to 9 degrees, 9 to 10 degrees, degrees between the aforementioned rotation degrees, or other degrees. In some embodiments, the fore slot 54 and the aft slot 60 can be spaced apart along a length of the side face 58. In some embodiments, the fore slot 54 and the aft slot 60 can be spaced apart by a circumference of an upper edge of the side face 58.

As described below, the pivot assembly 34 can include a spring or other biasing member that biases the pin 52 toward the rod 46 and/or a lower or central portion of the pivot assembly 34. The pin 52 can move between the fore and aft slots 54, 60 by sliding along a rail 74. The biasing member can apply a force to the pin 52 to hold the pin 52 against the rail 74 so that when the pin 52 is positioned within at least a portion of the fore or aft slot 54, 60 the pin 52 automatically is positioned within the slot 54, 60. In some configurations, the pin 52 can remain seated within the slot 54, 60 until a force (such as a force away from the rod 46) is applied to draw the pin 52 radially away from the rod 46.

Figure 4:
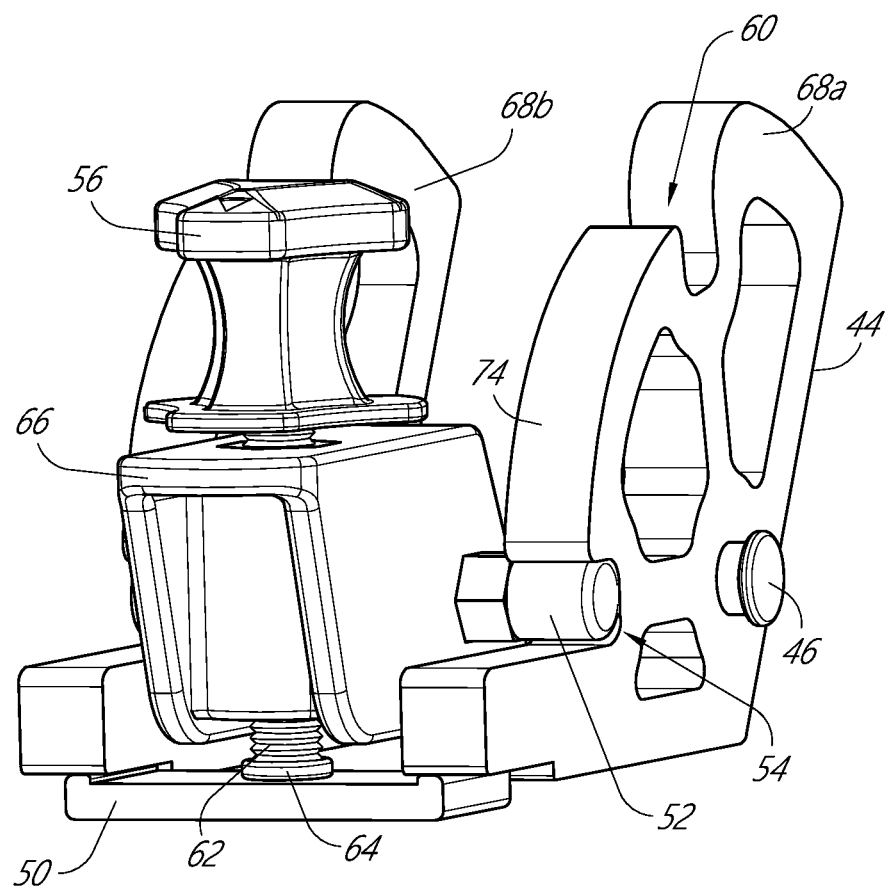
FIG. 4 illustrates a front perspective view of a pivot assembly of an embodiment of a scooter.

FIG. 4 shows an embodiment of the pivot assembly 34 with the surrounding portions of the scooter 10 removed for the sake of clarity. In some embodiments, the pin 52 can be coupled to a collar 66. In some embodiments, the collar 66 can be disposed between two lateral portions 68*a,b* of the bracket 44. In some embodiments, the lateral portions 68*a,b* are generally identically shaped or sized and/or have different shapes or sizes. In some embodiments, the pin 52 can extend from either side of the collar 66. The pin 52 can be seated in a fore slot 54 of at least one or both of the lateral portions 68*a,b*. In some variants, the bracket 44 can have only one lateral portion 68. In such configurations, the pin 52 can extend from only one side of the collar 66 and/or the pin 52 can be seated in the corresponding fore slot 54.

In some embodiments, the knob 56 can be attached to a threaded core 62. The threaded core 62 can pass through the collar 66. In some embodiments, the threaded core 62 can include a foot 64 that can rest on the brace portion 50 of the bracket 44. In some embodiments, as the knob 56 is turned in a first rotational direction (e.g., clockwise) the foot 64 moves away from the collar 66 and/or toward the brace portion 50. In some configurations, turning the knob 56 in a second rotational direction (e.g., counter-clockwise) that is opposite to the first rotational direction can move the foot 64 toward the collar 66 and/or away from the brace portion 50. The extension and/or retraction of the foot 64 relative to the collar 66 and/or the brace portion 50 can be achieved by various configurations of the pivot assembly 34.

In some embodiments, the threaded core 62 can be coupled with the knob 56 and/or with the foot 64. In some configurations, rotation of the knob 56 can result in rotation of the threaded core 62 and/or the foot 64. The knob 56, the threaded core 62, and/or the foot 64 can be coupled together and/or can rotate together as a unit. In some embodiments, the collar 66 can have an internal thread. The internal thread can mate with an external thread of the threaded core 62. In some configurations, rotation of the knob 56 in the first rotational direction advances the knob 56 along the internal thread of the collar 66. Such configurations can move the knob 56 toward the collar 66 and/or push the foot 64 against the brace portion 50.

Figure 5:
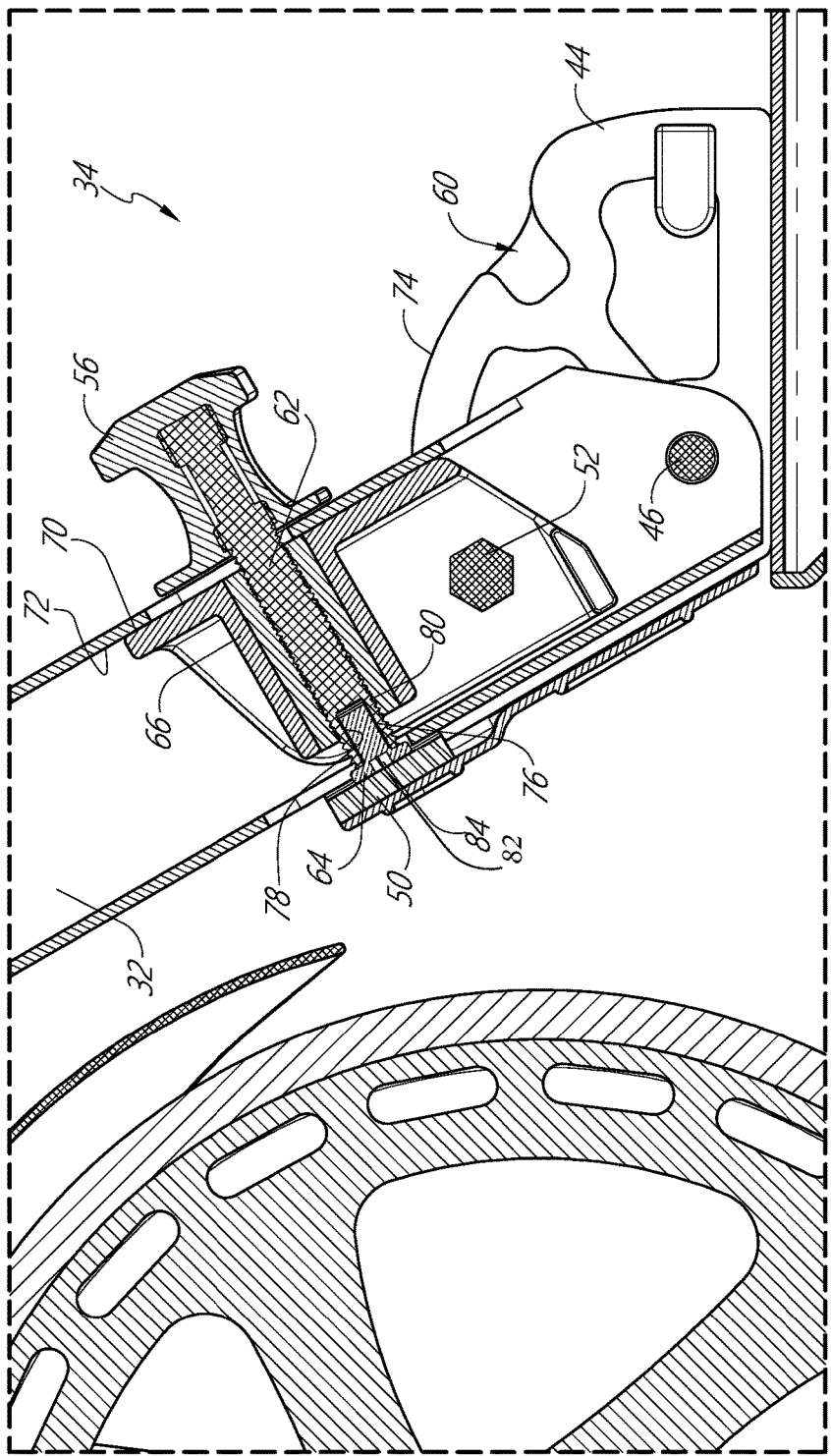
FIG. 5 illustrates a side cross-sectional view of the pivot assembly of FIG. 4 showing certain features of the pivot assembly.

FIG. 5 is a side cross-sectional view of an embodiment of the pivot assembly 34. In some embodiments, the foot 64 can include an external thread 76. The external thread 76 can mate with an internal thread 78 of a base portion 80 of the threaded core 62. A surface of the foot 64 that faces the brace portion 50 can have a recess 82 (e.g., FIG. 7C). The recess 82 can receive an anti-rotation protrusion 84. The anti-rotation protrusion 84 can extend from the brace portion 50. As shown in at least FIG. 7C, the recess 82 can have a hexagonal shape. In some embodiments, the recess 82 can be shaped to receive a protrusion, such as a hexagonal-shaped protrusion (not shown) that extends from the base portion 50. In some embodiments, the protrusion 84 can be fixed so that the protrusion 84 can be inhibited from rotating with respect to the longitudinal axis of the protrusion 84. Once the protrusion 84 is seated in the recess 82, the protrusion 84 can inhibit or prevent the foot 64 from rotating about the longitudinal axis of the foot 64.

In some embodiments, the core 62 can include a plurality of ridges and/or grooves. In some embodiments, the collar 66 can include a plurality of ridges and/or grooves. In some embodiments, the plurality of ridges and/or grooves of the core 62 and the ridges and/or grooves of the collar 66 can intermesh. The intermeshing ridges and grooves can allow the core 62 to rotate within the collar 66 and/or prevent the core 62 from moving longitudinally relative to the collar 66.

For example, in some embodiments, the intermeshing ridges and grooves can circumferentially surround the longitudinal axis of the core 62 while maintaining a set longitudinal position. In some embodiments, the ridges can include a plurality of protrusions that are isolated from one another by a groove positioned between adjacent ridges. In some embodiments, the ridges do not form a continuous protrusion that forms a helical thread.

In some embodiments, the knob 56 can be fixed to and/or be integrally formed with the core 62. In some embodiments, the core 62 can rotate with the knob 56. The pin 52 can be seated in the fore slot 54, and/or the protrusion 84 can be seated in the recess 82. As the knob 56 is turned in the first rotational direction, the knob 56 can cause the core 62 to rotate in the first rotational direction, such as when the knob 56 is fixed to the core 62. In some embodiments, the core 62 can rotate around the foot 64. In some embodiments, the foot 64 can be generally prevented from rotating with the core 62, for example, since the protrusion 84 can be seated in the recess 82. In some configurations, the internal thread 78 of the core 62 rotates relative to the external thread 76 of the foot 64. Some configurations can push the foot 64 away from the collar 66.

In some embodiments, at least a portion of the support assembly 32 can be hollow. In some embodiments, the support assembly 32 can receive the collar 66. In some embodiments, the collar 66 can include a top surface 70. The top surface 70 of the collar 66 can slide along an inner surface 72 of the support assembly 32. For example, the surface 70 can include a slot in which the core 62 slides. The slot can extend in a direction that is generally parallel with the longitudinal axis of the support assembly 32.

In some embodiments, when the knob 56 is turned in the first rotational direction to push the foot 64 away from the collar 66, the foot 64 can press against the brace portion 50 and/or push the top surface 70 of the collar 66 against the inner surface 72 of the support assembly 32. In some embodiments, pressing at least a portion of the collar 66 against at least a portion of the support assembly 32 can create a frictional force. In various embodiments, turning the knob 56 in the first rotational direction can secure the pivot assembly 34. In certain confirmations, the pivot assembly 34 does not appreciably rattle or wobble when the scooter 10 is in use. The frictional forces between the collar 66 and the support assembly 32 can reduce the rattle and wobble of the pivot assembly 34. In certain variants, the collar 66 can ride inside a track that can be mounted to the support assembly 32. In some embodiments, turning the knob 56 in the first rotational direction can push the collar 66 against a flange of the track. Some configurations can secure the pivot assembly 34 and/or reduce rattling and wobbling of the pivot assembly 34.

Figure 6A:
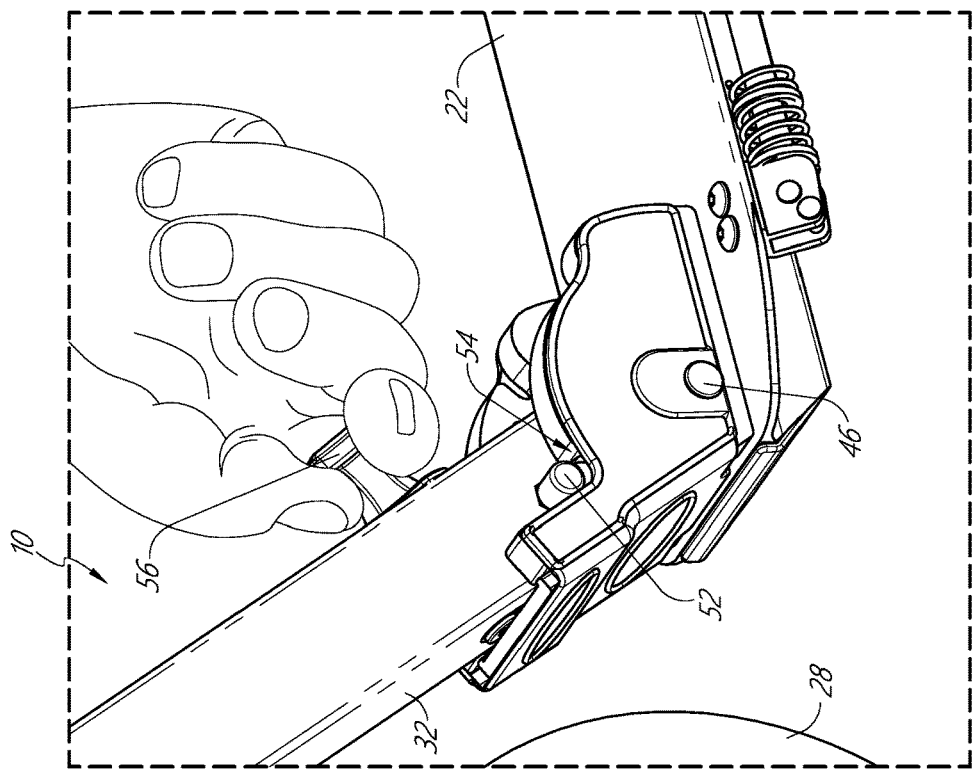
FIGS. 6A-6D illustrate partial side views of the pivot assembly of FIG. 4, showing various stages of use during the folding of an embodiment of a scooter.
Figure 6B:
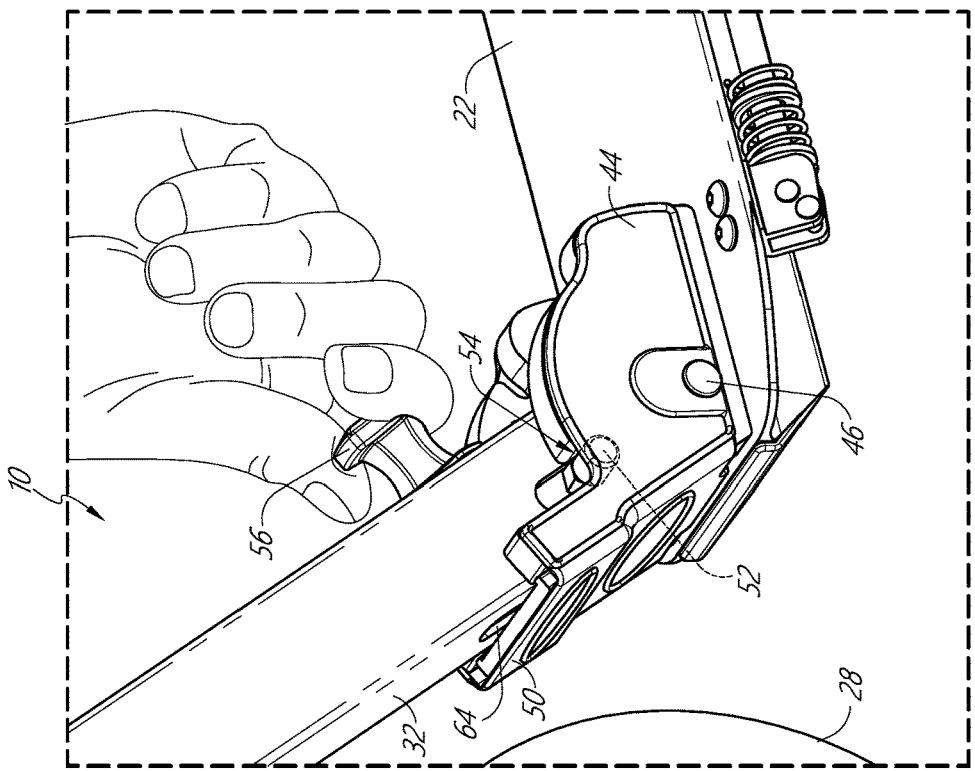
Figure 6D:
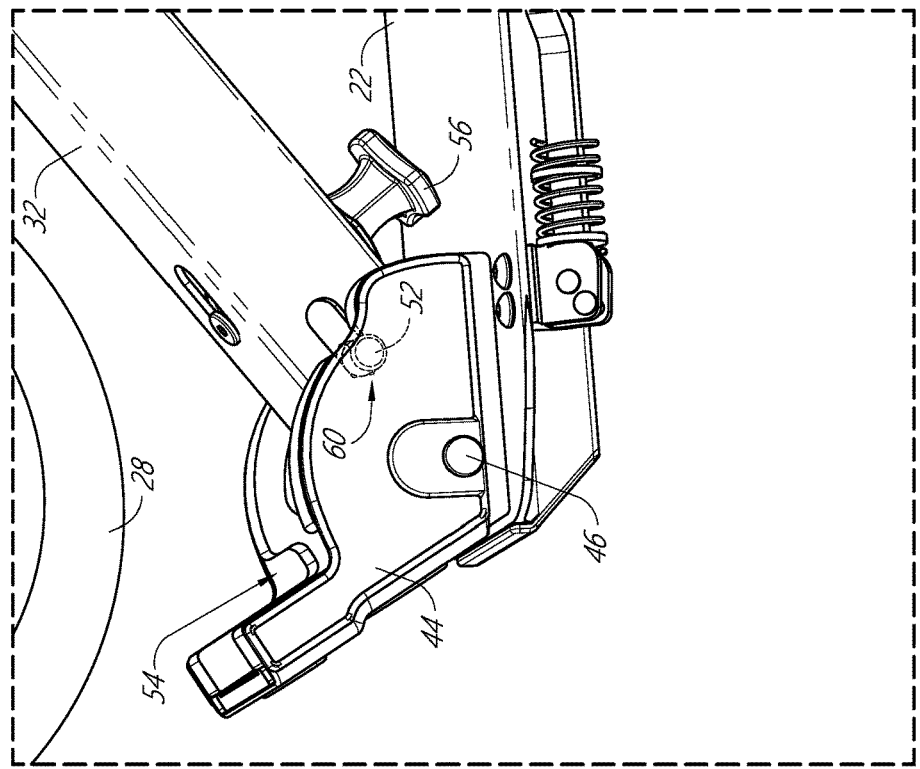
Figure 6C:
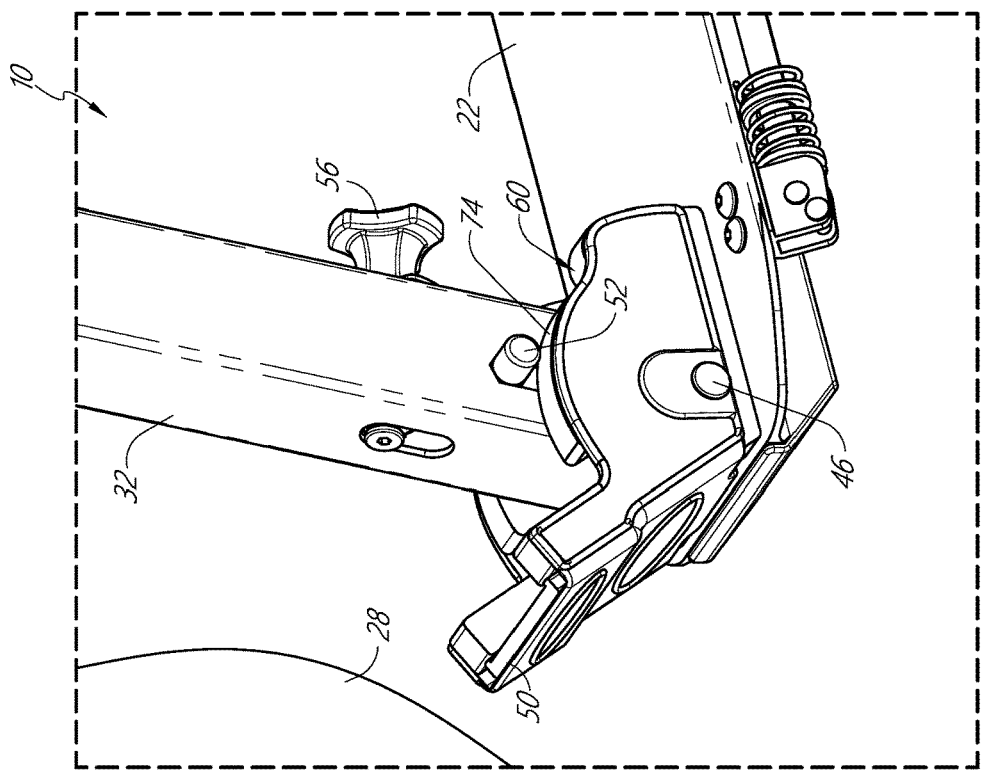

FIGS. 6A-6D show a method of folding the scooter 10. FIG. 6A illustrates a portion of the scooter 10 in an unfolded configuration. The pin 52 can be seated in (e.g., fully within) the fore slot 54 of the bracket 44. As shown, the user can turn the knob 56 in the second rotational direction. Turning the knob 56 can relieve the compression force between the foot 64 and the brace portion 50. As shown in at least FIG. 6B, the user can slide the knob 56 along the support assembly 32 to draw the pin 52 radially away from the rod 46 until at least a portion of the pin 52 exits the fore slot 54 of the bracket 44. Figure 6C shows the pin 52 drawn entirely out of the slot 54 and the support assembly 32 rotated at least partially toward the deck 22 of the scooter 10. As shown, the pin 52 can be positioned between the slots 54, 60. In some embodiments, the pin 52 can be positioned between the slots 54, 60 when the support assembly 32 is rotated toward the deck 22. As the scooter 10 is folded and/or the support assembly 32 is rotated toward the deck 22, the pin 52 can slide along the rail 74 as the pin 52 moves away from the fore slot 52 and toward the aft slot 54. FIG. 6D shows the scooter in a folded configuration. As shown, the pin 52 can be seated (e.g., fully within) within the aft slot 60. In this position, the biasing member (not shown) can push the pin 52 radially toward the rod 46 to seat the pin 52 in the aft slot 60 and/or retain the pin 52 within the slot 60. The support assembly 32 can be generally fully secured relative to the deck 22 when the pin 52 is fully seated in the aft slot 60.

Figure 7B:
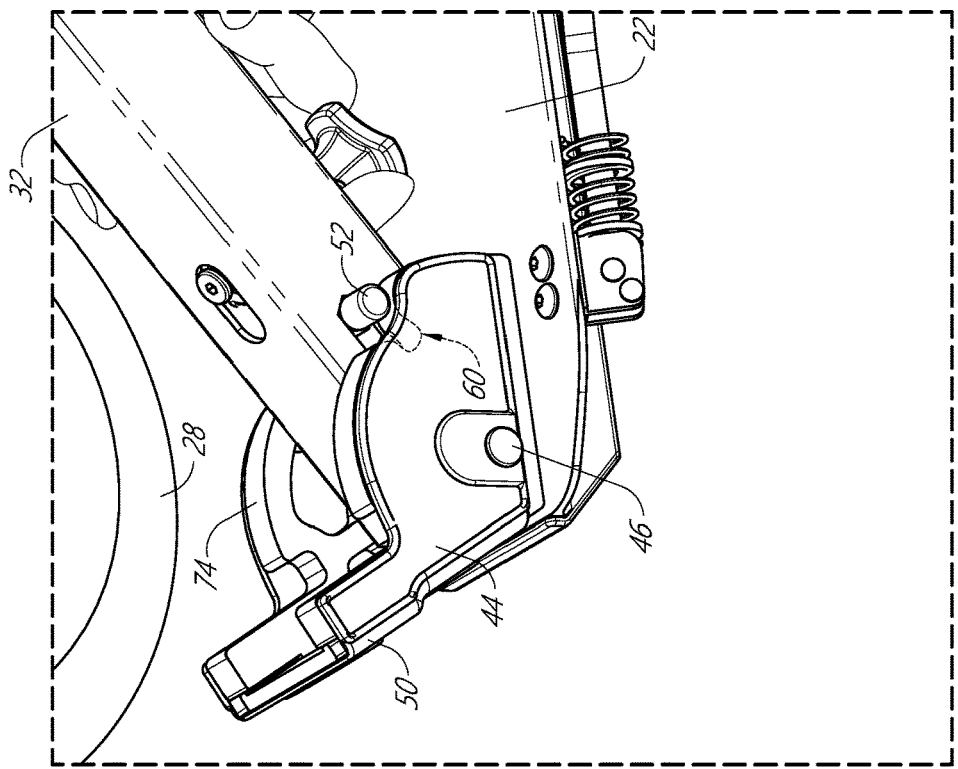
FIGS. 7A-7F illustrate partial side views of the pivot assembly of FIG. 4, showing various stages of use during the unfolding of a scooter.
Figure 7A:
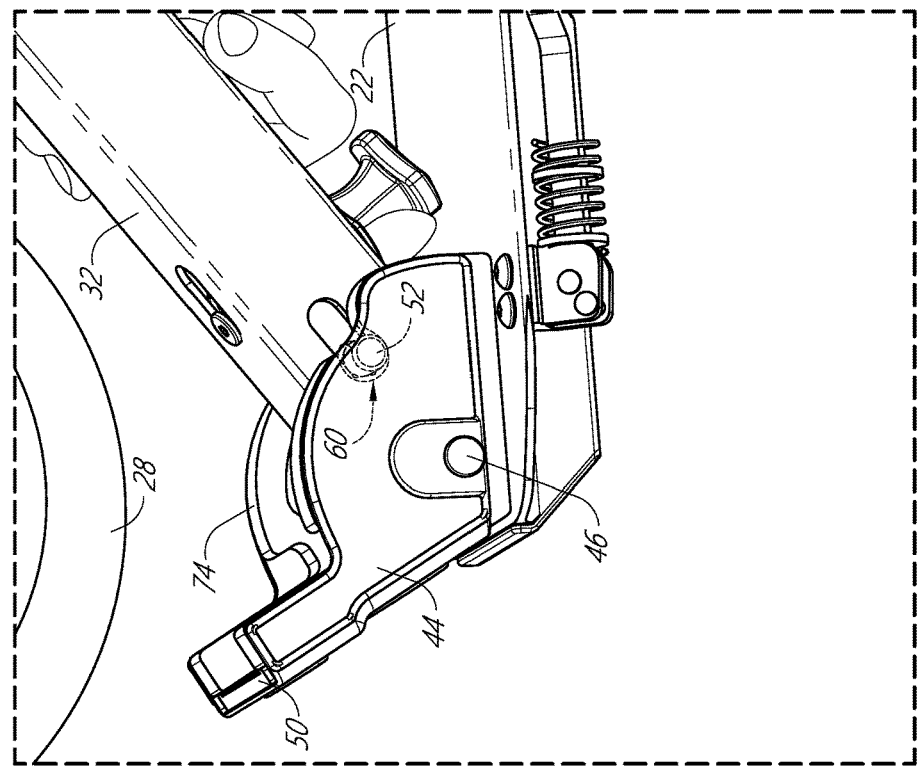
Figure 7D:
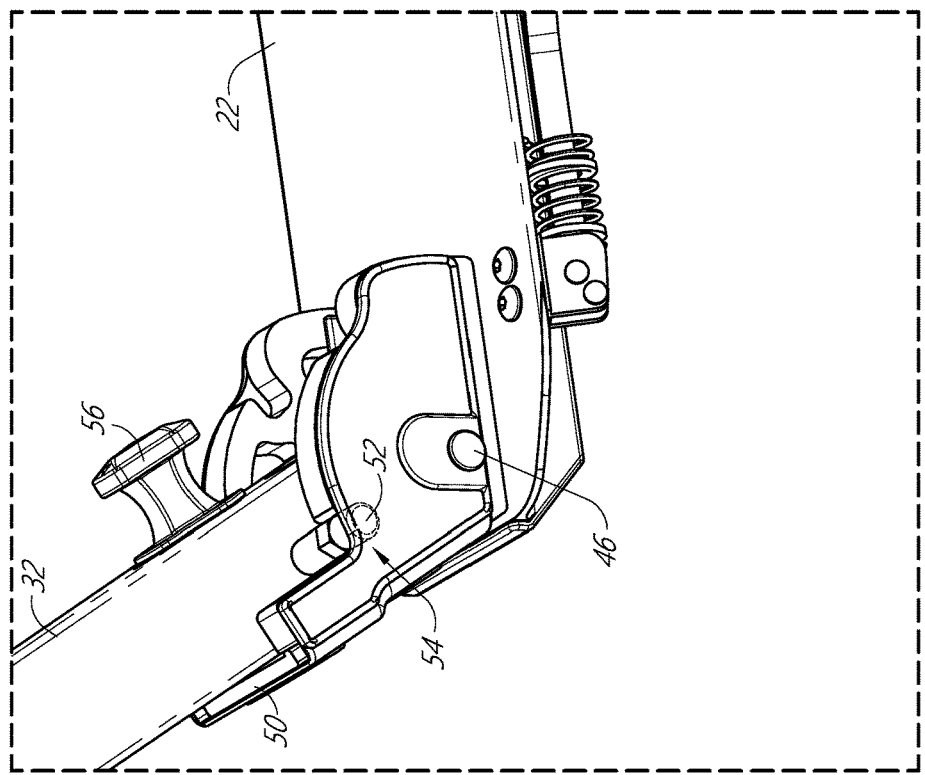
Figure 7C:
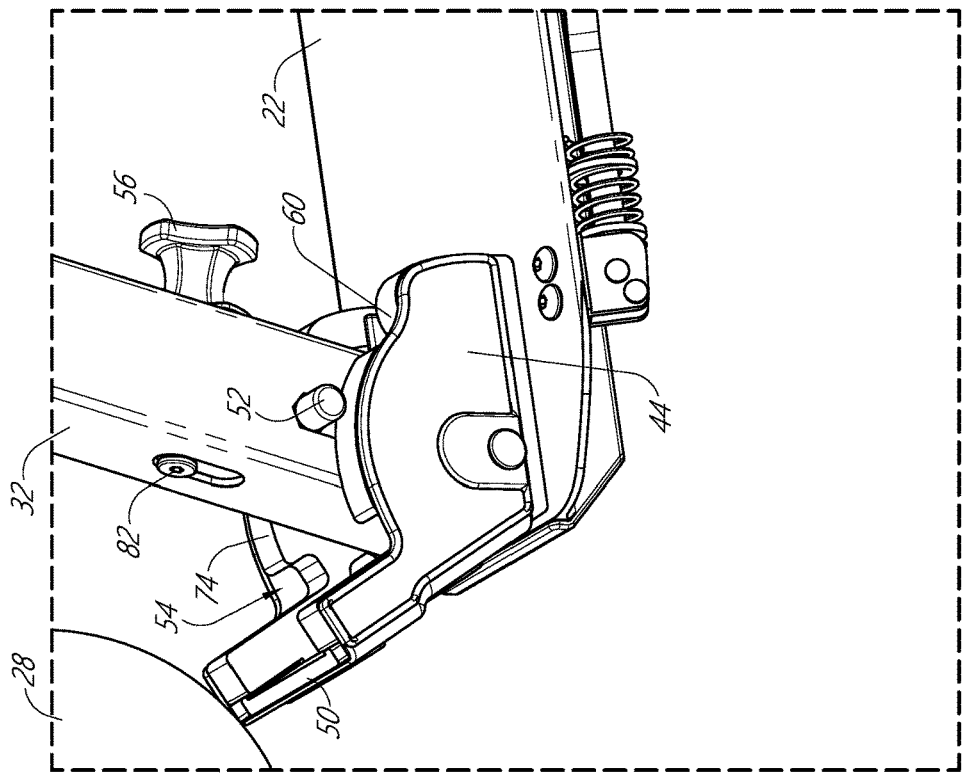
Figure 7E:
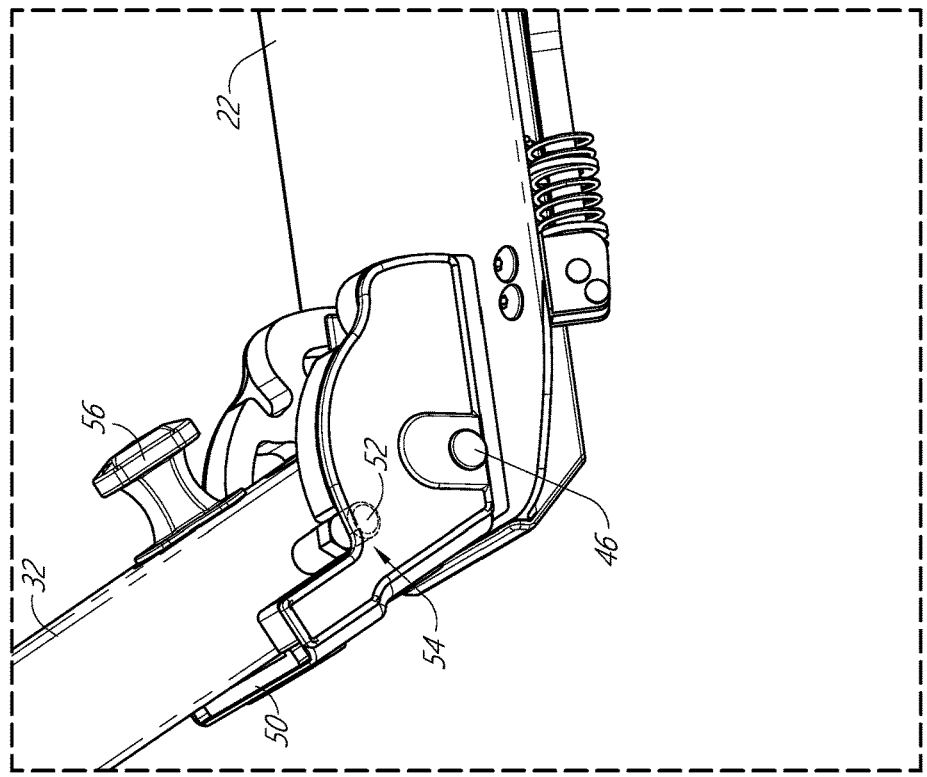
Figure 7F:
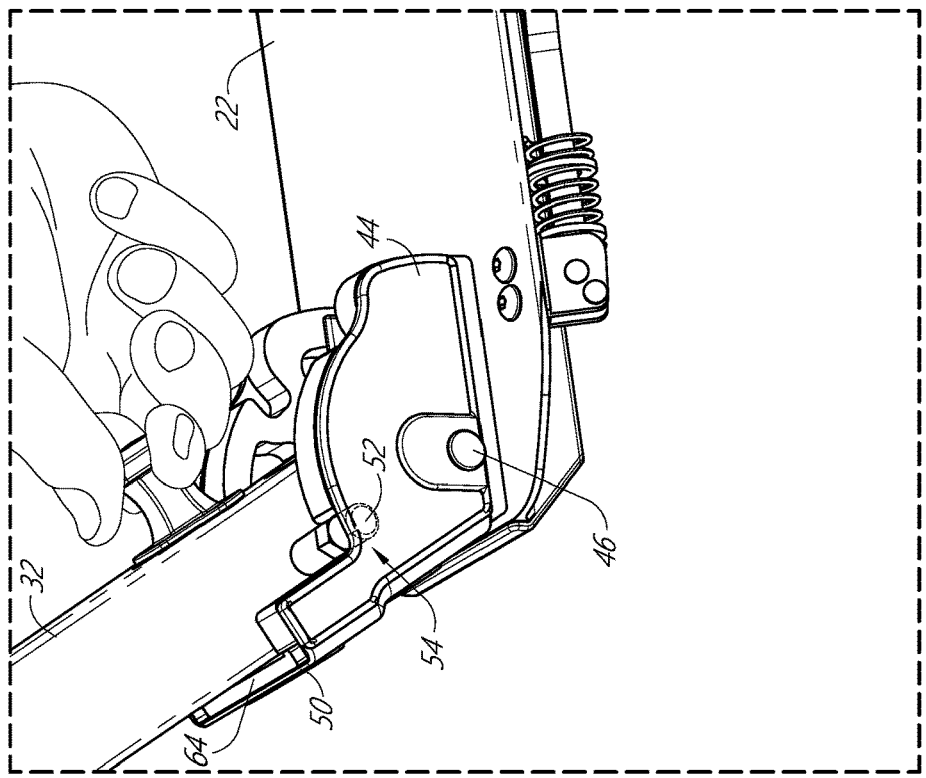

FIGS. 7A-7F show a method of unfolding the scooter 10. FIG. 7A shows the support assembly 32 and the deck 22 of the scooter 10 in the folded configuration. In the folded configuration, the pin 52 is seated in (e.g., fully within) the aft slot 60 of the bracket 44. FIG. 7B depicts a user sliding the knob 56 along the support assembly 32 to bring the pin 52 out of the aft slot 60. As shown in FIG. 7C, for example, the pin 52 slides along the rail 74 from the aft slot 60 toward the fore slot 54 as the support assembly 32 is rotated toward the brace portion 50 of the bracket 44. FIG. 7D shows the pin 52 fully seated within the fore slot 54. In some embodiments, the biasing member (not shown) can push the pin 52 radially toward the rod 46 to seat the pin 52 in the fore slot 54. FIG. 7E shows a user turning the knob 56 in the second rotational direction to push the foot 64 against the brace portion 50 of the bracket 44. Such configurations can create a compressive force that reduces and/or eliminates rattling and/or wobbling of the pivot assembly 34 when the scooter 10 is used. FIG. 7F depicts the scooter 10 in the unfolded configuration. As shown, the knob 56 has been advanced sufficiently in the second rotational direction to reduce or eliminate rattling and/or wobbling of the pivot assembly 34 when the scooter 10 is used, as described herein. The pin 52 can be seated in the fore slot 54 of the bracket 44 so that the support assembly 32 can be generally fully secured relative to the deck 22 when the pin 52 is fully seated in the fore slot 54.

Center Stand

As mentioned above, FIGS. 1A and 1B illustrate an embodiment of the scooter 10. The scooter 10 can include the center stand 40. FIG. 1B shows an embodiment of the center stand 40 when the center stand 40 is in the retracted position. In some embodiments, the center stand 40 can be mounted underneath the deck 22. In some embodiments, the center stand 40 can move between a retracted and/or a deployed position. In the retracted position, the center stand 40 can be positioned substantially parallel to a top surface of the deck 22. In the deployed position, the center stand 40 can form an angle with the deck 22 and/or may not be generally parallel to the deck 22. When the center stand 40 is in the retracted position, the scooter 10 can roll without the center stand 40 contacting a riding surface upon which the scooter rolls. When the center stand 40 is in the deployed position, a portion of the center stand 40 may contact the riding surface. Such configurations can allow the center stand 40 to hold the scooter 10 in an upright position while the scooter 10 is stationary.

The center stand 40 can have an ear portion 42. The ear portion 42 can extend laterally away from one or both lateral sides of the scooter body 20. In some embodiments, a portion of the ear portion 42 that extends from the near side of the scooter body 20 is visible, while the ear portion 42 that extends from the far side of the scooter body 20 cannot be seen from this view. The ear portion 42 can be sized and positioned so that a user can push by foot the ear portion 42 from the retracted position to the deployed position. In some embodiments, the ear portion 42 can be positioned below the deck 22. In some embodiments, the ear portion 42 can be positioned immediately adjacent to the scooter body 20. In some embodiments, the ear portion 42 can form a tubular structure with a generally U-shape, among other shapes. The ear portion 42 can form a ledge that can be disposed lower than (e.g., closer to the ground than) the scooter body 20. In some variants, the top of the ear portion 42 can be generally parallel to the deck 22 of the scooter 10. The ear portion 42 can be positioned slightly closer to the front wheel 28 than to the rear wheel 29. In some embodiments, the ear portion 42 can be a single bar, can be spaced apart from the scooter body 20, and/or can be positioned closer to the rear wheel 29 than to the front wheel 28.

Figure 8:
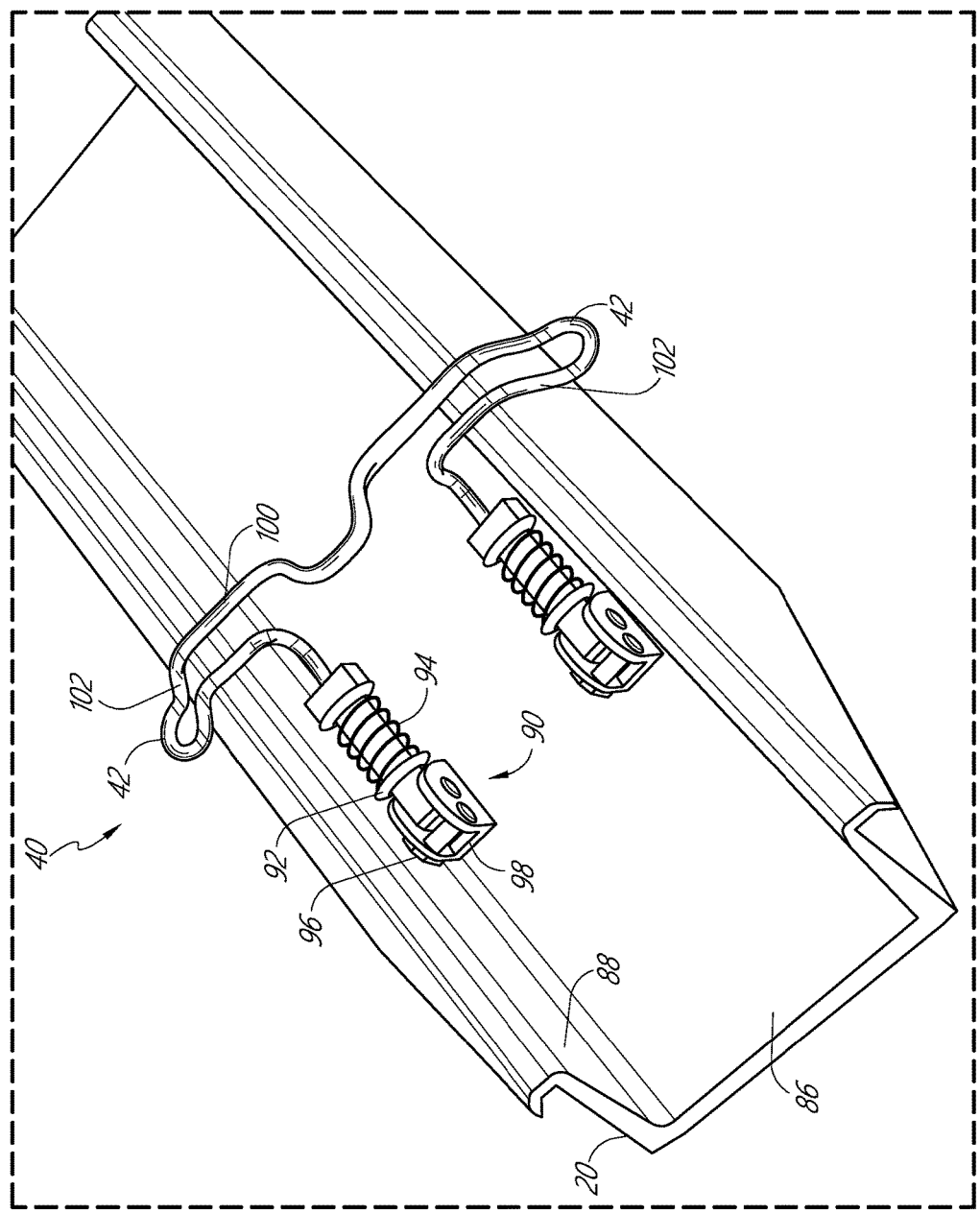
FIG. 8 illustrates a bottom view of a center stand that can be mounted on a portion of the scooter of FIG. 8.

FIG. 8 is a bottom view of a portion of the scooter body 20 showing an embodiment of the center stand 40 in the retracted position. The embodiments of the center stand 40 described and/or shown herein can be used with any of the scooters 10 described and/or shown herein. In some embodiments, the scooter body 20 can include a recessed central portion 86. The central portion 86 can be disposed between a pair of sidewalls 88.

The center stand 40 can be attached to the central portion 86 of the scooter body 20 by at least one or two mount assemblies 90. In some embodiments, the mount assemblies 90 can be spring-loaded. The mount assemblies can draw the center stand 40 toward the central portion 86 once a collar 92 of the spring 94 passes over an inflection point on a cam surface 96 of a mounting bracket 98. In some embodiments, the inflection point is positioned at a general center of the cam surface 96, and/or closer to one or more of the ends of the cam surface 96. In some variants, the center stand 40 can be attached to the scooter body 20 by a single mount assembly 90. In some embodiments, the mount assembly 90 can be attached to the sidewall 88 of the scooter body 20 and/or not attached to the central portion 86 of the scooter body 20. In some embodiments, in the retracted position, the mount assembly 90 and at least a portion of the center stand 40 can be recessed in (e.g., received in and/or not protruding from) the recessed central portion 86.

In some embodiments, the center stand 40 can have a base portion 100. The base portion 100 can extend across the central portion 86 of the scooter body 20. In some embodiments, the base portion 100 can be positioned substantially perpendicular to sidewalls 88 of the scooter body 20. In some embodiments the ear portions 42 can be disposed at the lateral extent of the base portion 100. (e.g., FIG. 8). In some embodiments, the base portion 100 can have an arm portion 102 that wraps around at least a portion of the sidewall 88 of the scooter body 88. In some embodiments, the arm portion 102 can position the ear portion 42 toward the deck 22 of the scooter body 88.

Figure 9:
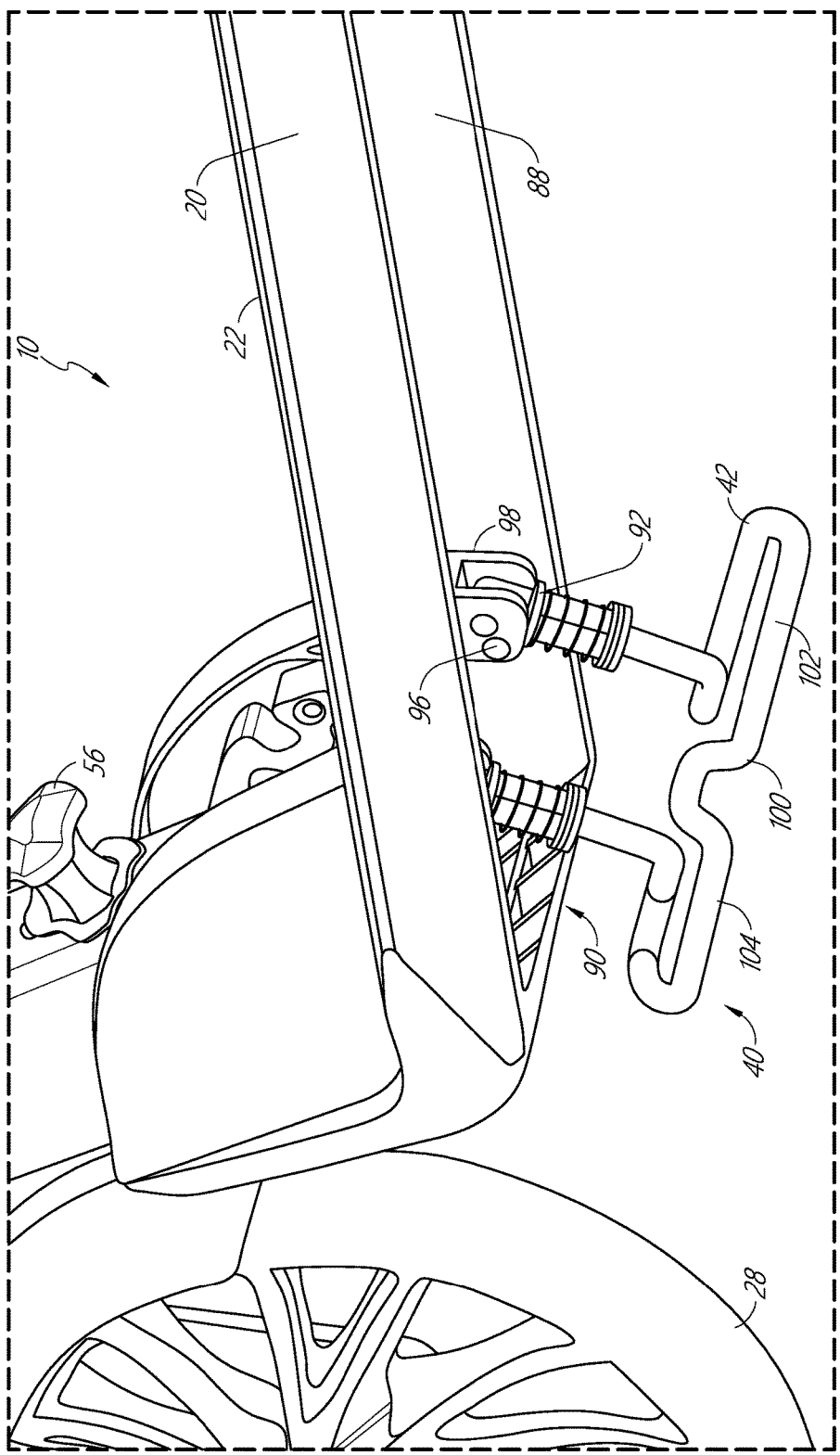
FIG. 9 illustrates a partial side view of an embodiment of the center stand of FIG. 8 in a deployed position.

FIG. 9 is a perspective view of the center stand 40 in the deployed position. In the deployed position, the base portion 100 of the center stand 40 can be in contact with the riding surface. In some variants, when the center stand 40 can be in the deployed position, the front wheel 28 can be elevated off of the riding surface. The center stand 40 can be positioned so that the arm portions 102 angle toward the rear of the scooter as the arm portions 102 extend in the lateral direction. In some configurations, the base portion 100 can have a bent footprint that provides stability to the center stand 40 when the center stand 40 can be in the deployed position. In some embodiments, the bent footprint of the center stand 40 can include a central portion 104. The central portion 104 can be substantially perpendicular to the side wall 88 of the scooter body 20. In some embodiments, the central portion 104 can be disposed between at least two arm portions 102 that are angled away from the front of the scooter 10.

In some embodiments, the center stand 40 can be automatically drawn into the retracted position as a user propels the scooter forward. A user can place one foot on the deck 22 of the scooter 10 and propel the scooter 10 forward by pushing off from the ground with the other foot. Movement of the scooter 10 can cause the center stand 40 to rotate from the deployed position to the retraced position. In some embodiments, as the scooter 10 moves forward and/or the base portion 100 remains in contact with the ground, the collar 92 of the spring 94 of the mounting assembly 90 can slide along the cam surface 96 of the mounting bracket 98. Once the collar 92 of the spring passes the inflection point 106 of the mounting bracket 98, the spring 94 can pull the center stand 40 against the side wall 88 of the scooter body 20. Such configurations can bring the center stand 40 into the fully retracted position. In various embodiments, the center stand 40 can be retracted by propelling the scooter 10 forward and may not require that the center stand 40 be retracted before the scooter 10 moves.

Figure 10:
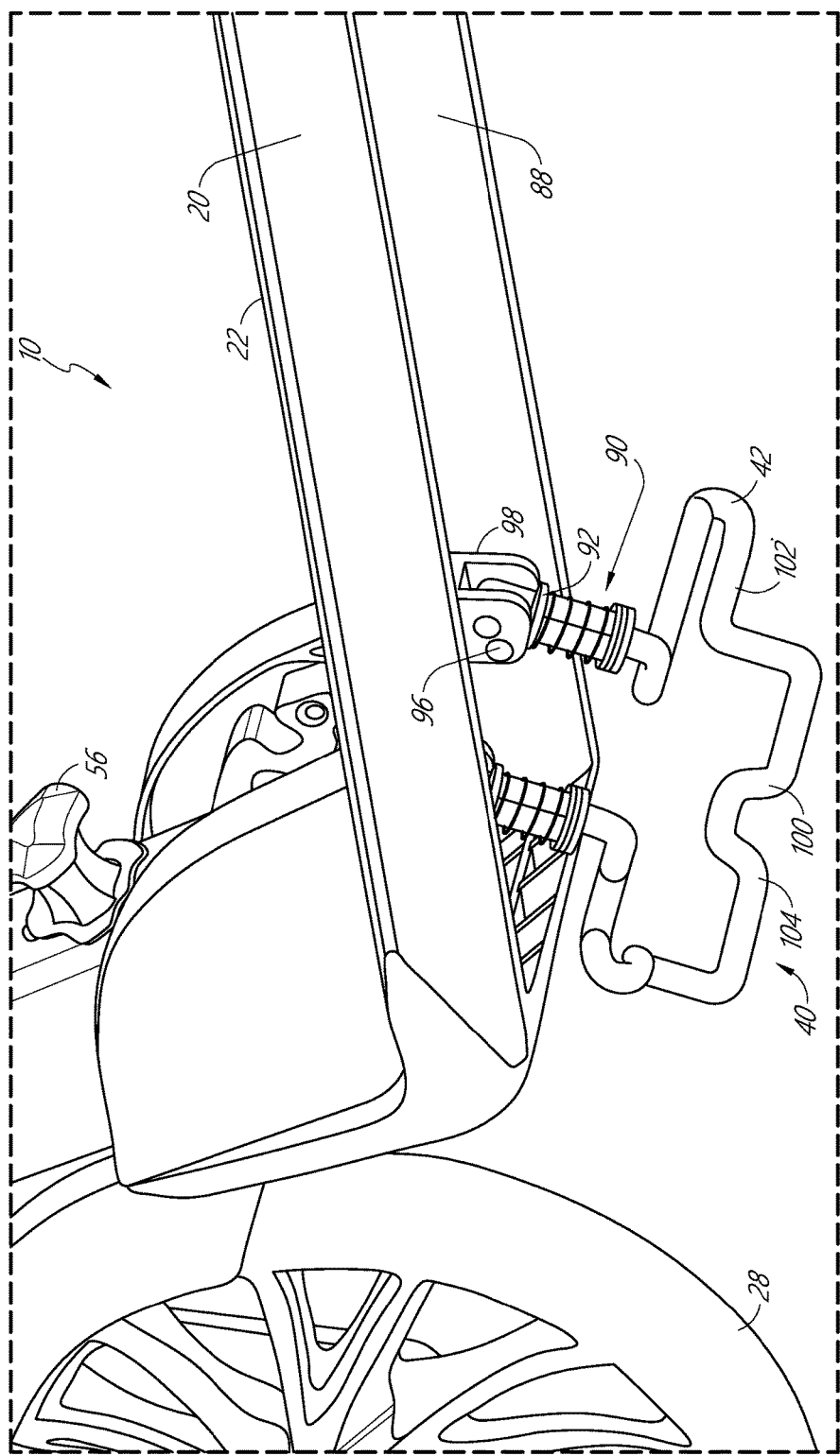
FIG. 10 illustrates a partial side view of another embodiment of the center stand of FIG. 8 in a deployed position.
Figure 11:
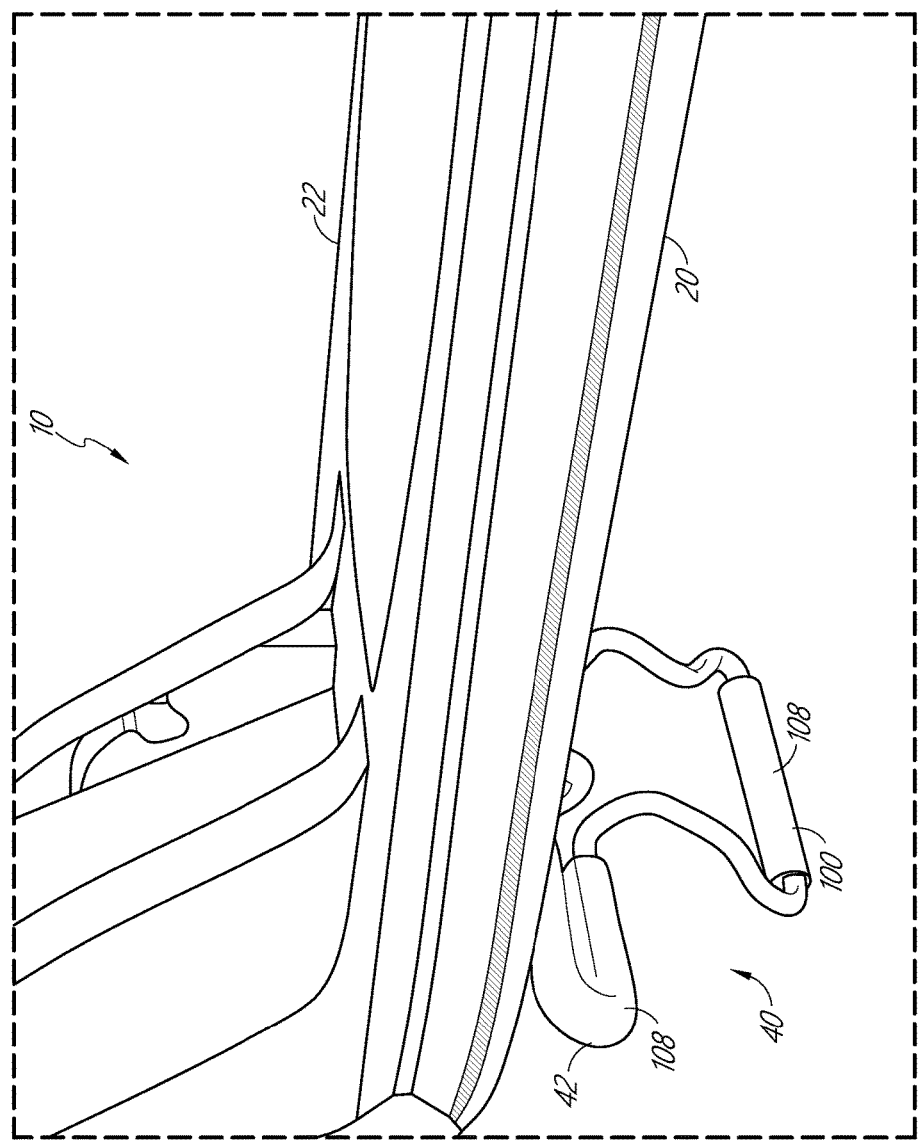
FIG. 11 illustrates a partial side view of another embodiment of the center stand of FIG. 8 in a deployed position.
Figure 12:
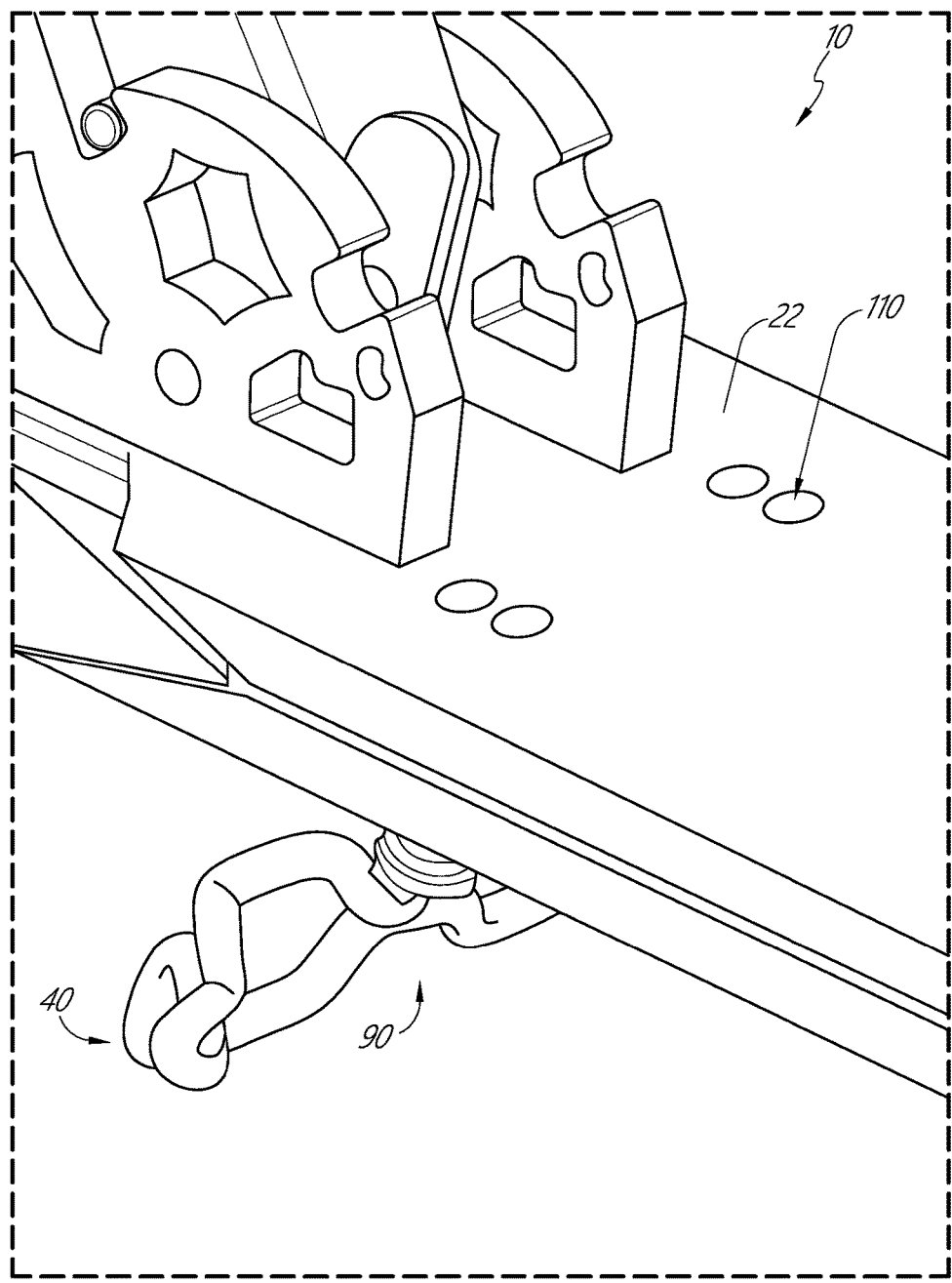
FIG. 12 illustrates a partial top view of a deck of a scooter, showing a portion of the center stand of FIG. 8 in a deployed position.

FIGS. 10-12 illustrate other embodiments of the center stand 40 that can include many of the same or identical features as described above. FIG. 10 depicts another embodiment of the center stand 40. As shown, the base portion 100 of the center stand 40 can produce a different footprint for the center stand 40. In some embodiments, the base portion 100 can adjust the placement of the ear portions 42 when the center stand 40 is in retracted and/or deployed position. FIG. 11 illustrates an embodiment of the center stand 40. As shown, the ear portions 42 can contact the scooter body 20 when the center stand 40 is in the deployed position. Some configurations can add stability to the scooter 10 when the scooter 10 is stationary by allowing the scooter to lean on at least the ear portion 42. In some embodiments, the center stand 40 can include cushioning features, such as foam portions 108. The foam portions 108 can be positioned on the ear portion 42 and/or on the base portion 100. In some embodiments, the foam portions 108 can enhance the stability of the scooter 10 when the scooter 10 is resting on the center stand 40. For example, the foam portions 108 can enhance friction between the center stand 40 and the riding surface. The enhanced friction can increase the stability of the scooter 10. FIG. 12 illustrates that the center stand 40 can be mounted to the scooter body 20 using through holes 110 that are disposed on the deck 22 of the scooter body 20.

Handgrip

Figure 13:
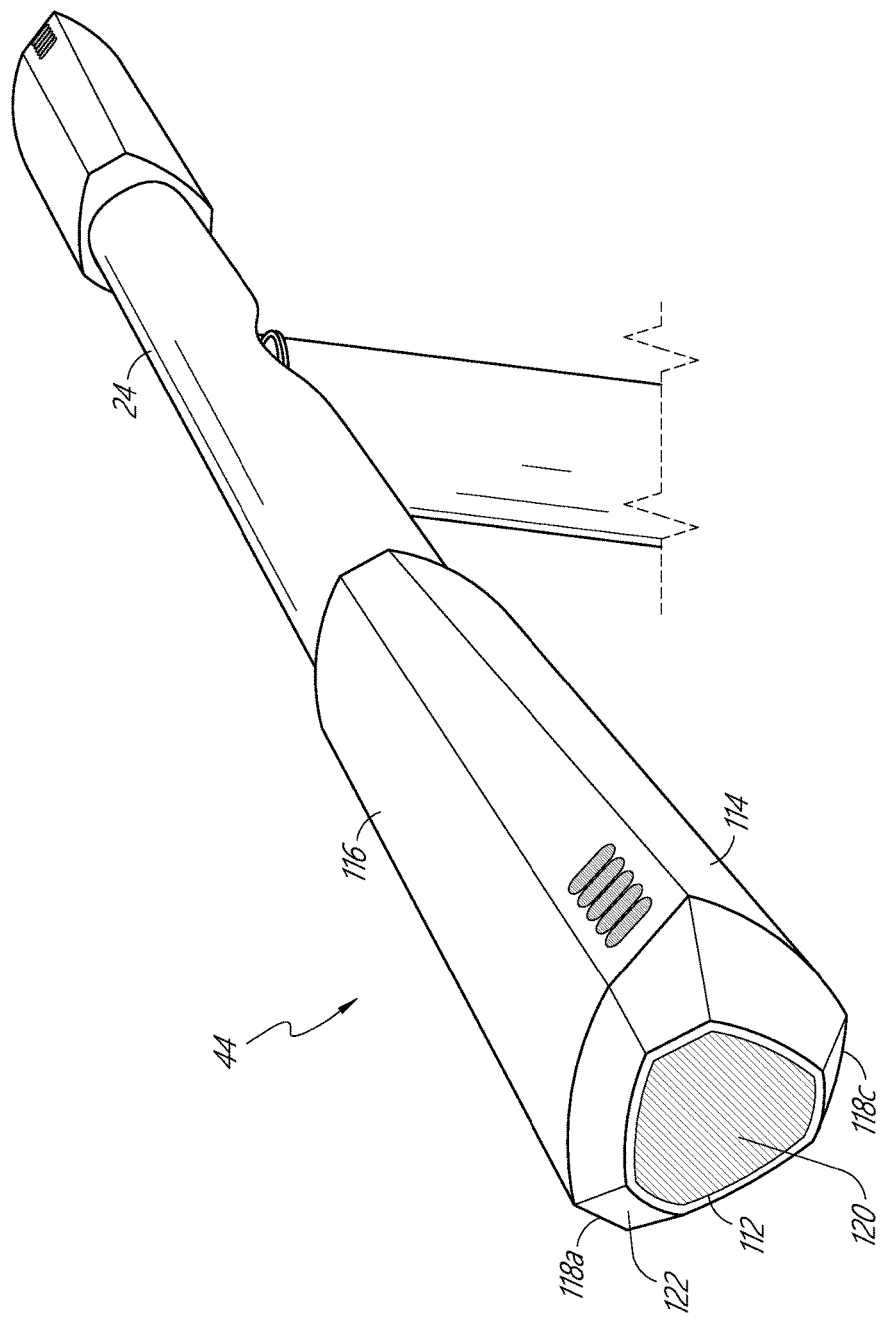
FIG. 13 illustrates a partial side view of an example handgrip mounted on a handle bar of an embodiment of a scooter.

FIG. 13 illustrates an embodiment of the handgrip 44. The embodiments of the handgrip 44 described and/or shown herein can be used with any of the scooters 10 described and/or shown herein. The scooter 10 can include a handgrip 44 mounted on one or both ends of the handlebar assembly 24. The handgrip 44 can include a substantially triangular shape, among others. In some embodiments, the handgrip 44 can include a front surface 112, a rear surface 114, and/or a top surface 116, among others. In use, a front surface 112 of the handgrip 44 can face toward the front wheel 28 of the scooter 10. The front surface 112 can be angled toward the ground at an angle of approximately 45°, as shown in FIG. 13. The handgrip 44 can include a rear surface 114 that faces toward the rear wheel 29 of the scooter 10. The rear surface 114 can be angled toward the ground at an angle of approximately 45°. The top surface 116 can be substantially parallel with the ground. In some embodiments, the front, rear, and top surfaces 112, 114, 116 can be slightly convex. Some configurations can improve comfort of the handgrip 44. The handgrip 44 can include intervening surfaces 118a,b,c. The intervening surfaces 118a, b, c can be disposed between the front, rear, and top surfaces 112, 114, 116.

In some embodiments, the handgrip 44 can include a cap surface 120. The cap surface 120 can be substantially transverse to the front, rear, and top surfaces 112, 114, 116. In some embodiments, the handgrip 44 can have facet surfaces 122. The facet surfaces 122 can connect the cap surface 120 to the other surfaces of the handgrip 44, as shown in at least FIG. 13.

Some configurations of the handgrip 44 can be adapted and/or oriented to enhance user comfort and/or control of the scooter 10. In some configurations, the top surface 116 and/or the intervening surface 118b can provide a slightly convex planar surface that supports the palm of the user. The front surface 112 and/or the intervening surface 118a can provide a comfortable radius of curvature for the fingers of the user to wrap around the handgrip 44.

Figure 14:
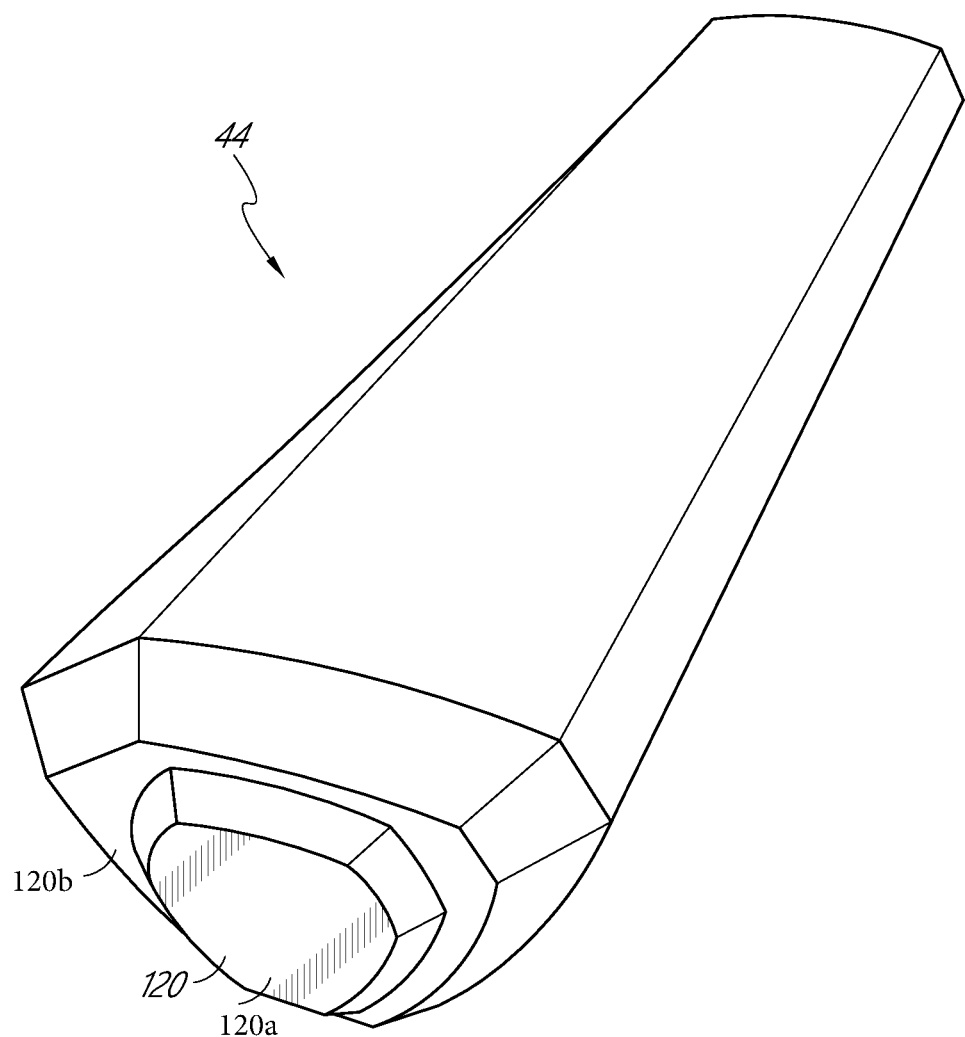
FIG. 14 illustrates a partial side view of the handgrip of FIG. 13.

FIG. 14 illustrates another embodiment of the handgrip 44 that can include a tiered cap surface 120. The tiered cap surface 120 can include a first surface 120a, and/or a second surface 120b. In some embodiments, the second surface 120b can be positioned inwardly from a central region of the handgrip 44. In some embodiments, the first surface 120a can be positioned inwardly from the second surface 120b.

Certain Terminology

Certain terminology may be used in the description for the purpose of reference only, and thus is not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly can include or tends toward a particular value, amount, or characteristic. As an example, in certain embodiments, as the context may permit, the term "generally parallel" can refer to something that departs from exactly parallel by less than or equal to 15°. Furthermore, as the context may dictate, the term "generally perpendicular" can mean something that departs from exactly, perpendicular by less than or equal to 15°. Furthermore, as the context may dictate, the term "generally aligned" can mean something that departs from exactly, aligned by less than or equal to 15°.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a device configured to carry out recitations A, B, and C" can include a first device configured to carry out recitation A working in conjunction with a second device configured to carry out recitations B and C.

The terms "comprising," "including," "having," and the like are synonymous and are used inclusively, in an open-ended fashion, and do not exclude additional elements, features, acts, operations, and so forth Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Summary

The various improvements (e.g., anti-rattle pivot assembly, center stand, and hand grips) have been disclosed in the context of certain embodiments and examples above. However, this disclosure extends beyond the specifically disclosed embodiments to other alternative embodiments and/or uses and obvious modifications and equivalents thereof. In particular, while the anti-rattle pivot assembly, the center stand, and the hand grips have been described in the context of illustrative embodiments, certain advantages, features, and aspects of the anti-rattle pivot assembly, the center stand, and the hand grips may be realized in a variety of other applications. Various features and aspects of the disclosed embodiments can be combined with or substituted for one another in order to form varying modes of the improvements. The scope of this disclosure should not be limited by the particular disclosed embodiments described herein.

Additionally, various aspects and features of the embodiments described can be practiced separately, combined together, or substituted for one another. A variety of combination and subcombinations of the disclosed features and aspects can be made and still fall within the scope of this disclosure. Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying drawings. The figures are drawn to scale, but such scale should not be interpreted as limiting, since dimensions and proportions other than what are shown are contemplated and are within the scope of this disclosure. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of improvements (e.g., anti-rattle pivot assemblies, center stands, and hand grips for personal mobility devices, such as scooters) have been disclosed. Although the improvements have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular embodiments described above, but should be determined only by a fair reading of the claims that follow.

The following is claimed:

1. A scooter comprising:
   a handlebar assembly;
   a deck; and
   a pivot assembly that couples the handlebar assembly to the deck, the pivot assembly comprising:
   a support assembly pivotably coupled to a bracket by a rod, the bracket comprising a rail having a first receiving region, a second receiving region spaced apart from the first receiving region, and an intermediate portion disposed between the first and second receiving regions, the intermediate portion being disposed a first distance away from the rod, the first distance being greater than a distance between the rod and the first or second receiving regions;
   a knob coupled to a pin by a collar, the knob configured to slide the pin radially relative to the rod;
   a brace portion extending across a face of the support assembly; and
   a shaft passing through the collar, a first end of the shaft being attached to the knob, a second end of the shaft being opposite the first end, wherein the knob is configured so that rotation of the knob in a first rotational direction moves the second end into engagement with the brace portion, thereby inhibiting rattling of the handlebar assembly relative to the deck;
   wherein:
   when the pivot assembly is in a first configuration, the second end of the shaft is engaged with the brace portion; and
   when the pivot assembly is in a second configuration, the second end of the shaft is spaced apart from the brace portion by a longitudinal gap.

2. The scooter of claim 1, wherein the knob advances longitudinally toward the support assembly as the knob is rotated in the first rotational direction.

3. The scooter of claim 1, further comprising a foot disposed between the second end of the shaft and the brace portion.

4. The scooter of claim 3, wherein one of the foot and the brace portion comprises a protrusion, wherein the other of the foot and the brace portion comprises a recess, the protrusion being configured to fit inside of the recess and inhibit rotation of the foot relative to a longitudinal axis of the shaft.

5. The scooter of claim 1, wherein the bracket comprises a first lateral portion and a second lateral portion, the support assembly being disposed between the first and second lateral portions.

6. The scooter of claim 5, wherein the first receiving region comprises an anterior first receiving region and a posterior first receiving region, the anterior first receiving region being disposed on the first lateral portion, the posterior first receiving region being disposed on the second lateral portion.

7. The scooter of claim 6, wherein the second receiving region comprises an anterior second receiving region and a posterior second receiving region, the anterior second receiving region being disposed on the first lateral portion, the posterior second receiving region being disposed on the second lateral portion.

8. The scooter of claim 7, wherein the pin comprises an anterior portion and a posterior portion, the anterior portion of the pin configured to contact at least a portion of the first lateral portion, the posterior portion of the pin configured to contact at least a portion of the second lateral portion.

9. The scooter of claim 1, wherein the knob is configured to rotate about a longitudinal axis of the shaft.

10. The scooter of claim 1, wherein the second end of the shaft comprises a foot.

11. A scooter comprising:
a handlebar assembly;
a deck; and
a pivot assembly that couples the handlebar assembly to the deck, the pivot assembly comprising:
  a rod;
  a brace portion;
  a first receiving region, a second receiving region spaced apart from the first receiving region, and an intermediate portion disposed between the first and second receiving regions;
a support assembly pivotably coupled to the pivot assembly, the support assembly comprising:
  a knob coupled to a pin by a collar, the knob configured to slide the pin along the intermediate portion;
  a shaft passing through the collar, a first end of the shaft being attached to the knob, a second end of the shaft being opposite the first end, wherein the knob is configured so that rotation of the knob in a first rotational direction moves the second end into engagement with the brace portion, thereby inhibiting rattling of the handlebar assembly relative to the deck;
wherein:
  when the pivot assembly is in a first configuration, the second end of the shaft is engaged with the brace portion; and
  when the pivot assembly is in a second configuration, the second end of the shaft is spaced apart from the brace portion by a longitudinal gap.

12. The scooter of claim 11, wherein the intermediate portion is disposed a first distance away from the rod, the first distance being greater than a distance between the rod and the first or second receiving regions.

13. The scooter of claim 11, wherein the knob advances longitudinally toward the support assembly as the knob is rotated in the first rotational direction.

14. The scooter of claim 11, further comprising a foot disposed between the second end of the shaft and the brace portion.

15. The scooter of claim 14, wherein one of the foot and the brace portion comprises a protrusion, wherein the other of the foot and the brace portion comprises a recess, the protrusion being configured to fit inside of the recess and inhibit rotation of the foot relative to a longitudinal axis of the shaft.

16. The scooter of claim 11, wherein the pivot assembly further comprises a first lateral portion and a second lateral portion, the support assembly being disposed between the first and second lateral portions.

17. The scooter of claim 16, wherein the first receiving region comprises an anterior first receiving region and a posterior first receiving region, the anterior first receiving region being disposed on the first lateral portion, the posterior first receiving region being disposed on the second lateral portion.

18. The scooter of claim 17, wherein the second receiving region comprises an anterior second receiving region and a posterior second receiving region, the anterior second receiving region being disposed on the first lateral portion, the posterior second receiving region being disposed on the second lateral portion.

19. The scooter of claim 18, wherein the pin comprises an anterior portion and a posterior portion, the anterior portion of the pin configured to contact at least a portion of the first lateral portion, the posterior portion of the pin configured to contact at least a portion of the second lateral portion.

20. The scooter of claim 11, wherein the knob is configured to rotate about a longitudinal axis of the shaft.

21. The scooter of claim 11, wherein the second end of the shaft comprises a foot.

* * * * *